United States Patent
Farrugia et al.

(10) Patent No.: US 12,384,867 B2
(45) Date of Patent: Aug. 12, 2025

(54) SPHERICAL PARTICLES COMPRISING CARBON NANOMATERIAL-GRAFT-POLYMER AND METHODS OF PRODUCTION AND USES THEREOF

(71) Applicant: Xerox Corporation, Norwalk, CT (US)

(72) Inventors: Valerie M. Farrugia, Oakville (CA); Shivanthi Easwari Sriskandha, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/603,343

(22) Filed: Mar. 13, 2024

(65) Prior Publication Data

US 2024/0247092 A1   Jul. 25, 2024

Related U.S. Application Data

(63) Continuation of application No. 17/321,997, filed on May 17, 2021, now Pat. No. 12,264,214.

(51) Int. Cl.
| | |
|---|---|
| *C08J 3/12* | (2006.01) |
| *C08F 292/00* | (2006.01) |
| *C08J 3/205* | (2006.01) |
| *C08L 77/06* | (2006.01) |

(52) U.S. Cl.
CPC ............ *C08F 292/00* (2013.01); *C08L 77/06* (2013.01)

(58) Field of Classification Search
None
See application file for complete search history.

(56) References Cited

U.S. PATENT DOCUMENTS

| | | | | |
|---|---|---|---|---|
| 4,863,646 A | * | 9/1989 | Watanabe | .................. C08J 3/12 |
| | | | | 264/9 |
| 2021/0069958 A1 | * | 3/2021 | Farrugia | .................. B29B 9/12 |

FOREIGN PATENT DOCUMENTS

| | | | | | |
|---|---|---|---|---|---|
| CN | 104098816 A | * | 10/2014 | | ............... C08K 3/04 |
| WO | WO-2013053946 A1 | * | 4/2013 | | ............. B82Y 30/00 |

OTHER PUBLICATIONS

Machine translation of CN-104098816-A (no date).*
McIntosh et al. "Benzoyl Peroxide Initiated In Situ Functionalization, Processing, and Mechanical Properties of Single-Walled Carbon Nanotube-Polypropylene Composite Fibers" J. Phys. Chem. C 2007, 111, 4, 1592-1600. (Year: 2007).*

* cited by examiner

*Primary Examiner* — Michael J Feely
(74) *Attorney, Agent, or Firm* — Vorys, Sater, Seymour and Pease LLP

(57) ABSTRACT

Highly spherical particles may comprise a thermoplastic polymer grafted to a carbon nanomaterial (CNM-g-polymer), wherein the particles have an aerated density of about 0.5 g/cm$^3$ (preferably about 0.55 g/cm$^3$) to about 0.8 g/cm$^3$. Said CNM-g-polymer particles may be useful in a variety of applications including selective laser sintering additive manufacturing methods.

14 Claims, 5 Drawing Sheets

Scheme 2

SPHERICAL PARTICLES COMPRISING CARBON NANOMATERIAL-GRAFT-POLYMER AND METHODS OF PRODUCTION AND USES THEREOF

FIELD OF INVENTION

The present disclosure relates to highly spherical particles that comprises carbon nanomaterial-graft-polymer (CNM-g-polymer). The present disclosure further relates to compositions, synthesis methods, and applications of such particles (also referred to herein as CNM-g-polymer particles).

BACKGROUND

Thermoplastic polymers are often used to make extruded objects like films, bags, particles, and filaments. Example of a thermoplastic polymer include polyamides, polyolefins, and polyurethanes. An example method of making thermoplastic polymers into objects that is increasingly being used in industry is three-dimensional (3-D) printing, also known as additive manufacturing. More specifically, selective laser sintering has enabled the direct manufacture of three-dimensional objects of high resolution and dimensional accuracy from a variety of materials including polystyrene, NYLON, other plastics, and composite materials, such as polymer coated metals and ceramics.

Polyamides are one of the most common polymers used in additive manufacturing because of its flow properties, lower cost than other polymers, and desirable sintering window. However, physical properties needed in objects produced by additive manufacturing may be beyond those of a polyamide.

Polyolefins, such as polyethylene and polypropylene, are one of the largest classes of commercial polymers due to their versatile properties, easily tailored microstructure, and relatively low cost. One method of tailoring the physical properties of and/or imparting new properties to the polyolefins is to incorporate fillers.

Polyurethanes have the ability to withstand elevated or low temperatures without loss of physical properties. The soft segments are typically polyols with a low glass transition temperature which impart flexibility to the polymer material. The hard segments are typically urethanes with chain extenders which provide toughness.

For these and other polymers, incorporation of fillers have been used to improve the properties of the objects formed from said polymers. Expanding the methods by which polymer-carbon nanomaterial composites can be manufactured into objects would further expand the polymer composite industry. However, additive manufacturing processes, especially selective laser sintering, often has stringent requirements on the size, shape, and flowability of the particulates used as raw materials in said processes. Fillers can often be difficult to incorporated, especially homogeneously, into said particulates while maintaining the requirements for additive manufacturing processes.

SUMMARY OF INVENTION

The present disclosure relates to highly spherical particles that comprises carbon nanomaterial-graft-polymer (CNM-g-polymer). The present disclosure further relates to compositions, synthesis methods, and applications of such particles (also referred to herein as CNM-g-polymer particles).

Disclosed herein are compositions comprising: particles (also referred to herein as CNM-g-polymer particles) comprising a thermoplastic polymer grafted to a carbon nanomaterial (CNM-g-polymer), wherein the particles have an aerated density of about 0.5 g/cm$^3$ (or about 0.55 g/cm$^3$) to about 0.8 g/cm$^3$. Said particles may further have one or more of the following properties: a circularity of about 0.90 to about 1.0; an angle of repose of about 250 to about 45°; a Hausner ratio of about 1.0 to about 1.5; a D10 of about 0.1 µm to about 125 µm, a D50 of about 0.5 µm to about 200 µm, and a D90 of about 3 µm to about 300 µm, where D10<D50<D90; a diameter span of about 0.2 to about 10; an aerated density of about 0.6 g/cm$^3$ to about 0.8 g/cm$^3$; a bulk density of about 0.3 g/cm$^3$ to about 0.8 g/cm$^3$; a tapped density of about 0.6 g/cm$^3$ to about 0.9 g/cm$^3$; and a BET surface area of about 10 m$^2$/g to about 500 m$^2$/g.

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
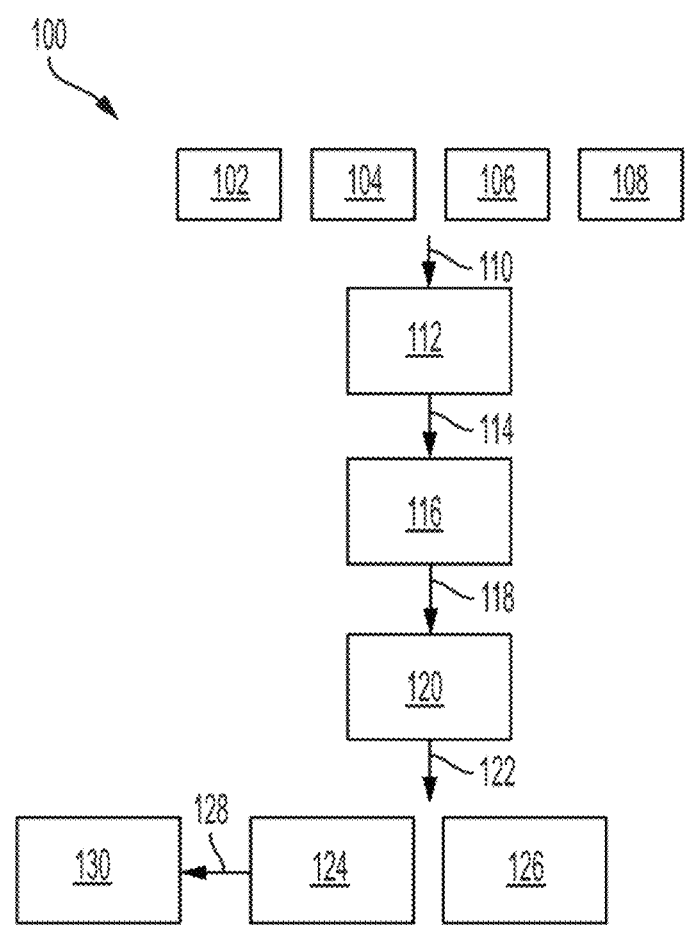
FIG. 1 is a flow chart of a nonlimiting example method of the present disclosure.

The present disclosure relates to highly spherical particles that comprises CNM-g-polymer. The present disclosure further relates to compositions, synthesis methods, and applications of such particles.

Three-dimensional (3-D) printing, also known as additive manufacturing, is a rapidly growing technology area. Although 3-D printing has traditionally been used for rapid prototyping activities, this technique is being increasingly employed for producing commercial and industrial objects, which may have entirely different structural and mechanical tolerances than do rapid prototypes.

3-D printing operates by depositing either (a) small droplets or streams of a melted or solidifiable material or (b) powder particulates in precise deposition locations for subsequent consolidation into a larger object, which may have any number of complex shapes. Such deposition and consolidation processes typically occur under the control of a computer to afford layer-by-layer buildup of the larger object. In a particular example, consolidation of powder particulates may take place in a 3-D printing system using a laser to promote selective laser sintering (SLS).

Powder particulates usable in 3-D printing include thermoplastic polymers, including thermoplastic elastomers, metals, and other solidifiable substances. When using composites in 3-D printing, the particulates (e.g., the carbon nanomaterial of a polymer-carbon nanomaterial composites) should be evenly dispersed throughout the small melted droplets or the powder particulate, or the distribution of the particulates of the final object will be uneven. Accordingly, the properties (e.g., strength and/or electrical conductivity)

of the object may also be irregular, which may introduce points of failure to the object.

The present disclosure relates to highly spherical particles that comprises polymers grafted to carbon nanomaterials (CNM-g-polymer composites). Advantageously, the compositions and methods of the present disclosure use in situ polymerization of the polymers. Therefore, the desirable melt and flow properties of the polymers may be exploited during the additive manufacturing methods.

Advantageously, highly spherical CNM-g-polymer particles/powder can be produced from the CNM-g-polymer composites of the present disclosure via, for example, melt emulsification. The said highly spherical CNM-g-polymer particles may be useful, among other things, as starting material for additive manufacturing (e.g., automotive parts, aerospace/aircraft-related parts, shoe soles, etc.), especially SLS 3-D printing. Further, the CNM-g-polymer particles in at least some embodiments may have a higher aerated density that is greater than the aerated density of particles produced by traditional methods (e.g., precipitation methods and cryomilling methods). Without being limited by theory, it is believed that a higher aerated density indicated better packing and/or flow of the particles, which may be advantageous in the application of such particles in SLS 3-D printing methods and the resultant object having less void space because of better packed particles.

Consequently and advantageously, parts or objects SLS printed from the highly spherical CNM-g-polymer particles of the present disclosure may have improved mechanical properties when compared to polymer-based microparticles either having no carbon nanomaterial or having simply compounded polymer and carbon nanomaterial.

Definitions and Test Methods

As used herein, the term "catalyst" refers to a compound that, when used at very low concentration in a reaction medium, allows the rate of a reaction (e.g., a polymerization reaction) to be increased via interaction with the reagents, without, however, being chemically altered at the end of the reaction.

As used herein, the term "cocatalyst" refers to a compound capable of acting synergistically with the catalyst to increase the rate of a reaction (e.g., a polymerization reaction).

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid room temperature and has a melting point of 65° C. Therefore, said polyethylene oxide is immiscible with a material that is liquid at room temperature if said material and said polyethylene oxide have less than 5 wt % solubility in each other at 65° C.

As used herein, the term "polyurethane monomer(s)" refers to a monomer(s) that form a polyurethane.

As used herein, the term "polyacid" when referring to a compound refers to a compound having two or more carboxylic acid moieties. Herein, anhydride moieties are considered carboxylic acid moieties because the anhydrides open to carboxylic acids during synthesis.

As used herein, the term "polyamine" when referring to a compound refers to a compound having two or more amine moieties.

As used herein, the term "amino acid" when referring to a compound refers to a compound having one or more carboxylic acid moieties and one or more amine moieties.

Again, anhydride moieties are considered carboxylic acid moieties because the anhydrides open to carboxylic acids during synthesis.

When referring to a polymer in terms of the —mer units (e.g., polyurethane monomers), it would be understood by one skilled in the art that the —mer units are in the polymerized form in the polymer.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

As used herein, the terms "carbon nanomaterial-graft-polyurethane" and "CNM-g-polyurethane" refer to a carbon nanomaterial as a central or backbone structure having a polyurethane extending therefrom. These terms do not imply the method by which the structure is produced but rather describe the structure itself.

As used herein, the term "carbon nanomaterial" refers to molecules or particles having at least one dimension being 50 nm or less where the core structure of the particle is composed of at least 50 atomic % carbon. Examples of carbon nanomaterials include, but are not limited to, fullerenes, carbon nanotubes, graphites, graphenes, and any combinations thereof.

As used herein, the term "fullerene" refers to particles or molecules having a cage as the core structure and the cage structure having an aspect ratio of 10 or less.

As used herein, the term "carbon nanotube" refers to particles or molecules having an elongated, cylindrical structure as the core structure and the elongated, cylindrical structure having an aspect ratio of more than 10. As used herein, the term "carbon nanotube" encompasses single-walled carbon nanotube (i.e., having one wall), double-walled carbon nanotube (i.e., having two walls), and multi-walled carbon nanotube (i.e., having two or more walls).

As used herein, the term "graphene" refers to particles or molecules having a planar graphitic structure and encompasses single-layer graphene to three-layer graphene.

As used herein, the term "graphite" refers to particles or molecules having more than three layers planar graphite.

The terms "carbon nanomaterial," "fullerene," "carbon nanotubes," "graphite," and "graphene" encompass functionalized versions thereof.

As used herein, the term "embed" relative to particles (e.g., nanoparticles) and a surface of a polymer particle refers to the particle being at least partially extending into the surface of the polymer particle such that polymer is in contact with the nanoparticle to a greater degree than would be if the nanoparticle were simply laid on the surface of the polymer particle.

Herein, D10, D50, D90, and diameter span are primarily used herein to describe particle sizes. As used herein, the term "D10" refers to a diameter below which 10% (on a volume-based distribution, unless otherwise specified) of the particle population is found. As used herein, the terms "D50", "average particle diameter," and "average particle size" refers to a diameter below which 50% (on a volume-based median average, unless otherwise specified) of the particle population is found. As used herein, the term "D90" refers to a diameter below which 90% (on a volume-based distribution, unless otherwise specified) of the particle population is found. As used herein, the terms "diameter span" and "span" and "span size" when referring to diameter provides an indication of the breadth of the particle size distribution and is calculated as (D90-D10)/D50.

Particle diameters and particle size distributions are determined by light scattering techniques using a Malvern MASTERSIZER™ 3000. For light scattering techniques, the control samples were glass beads with a diameter within the range of 15 μm to 150 μm under the tradename Quality Audit Standards QAS4002™ obtained from Malvern Analytical Ltd. Samples were analyzed as dry powders, unless otherwise indicated. The particles analyzed were dispersed in air and analyzed using the AERO S™ dry powder dispersion module with the MASTERSIZER™ 3000. The particle sizes were derived using instrument software from a plot of volume density as a function of size.

As used herein, when referring to sieving, pore/screen sizes are described per U.S.A. Standard Sieve (ASTM E11-17).

As used herein, the terms "circularity" relative to the particles refer to how close the particle is to a perfect sphere. To determine circularity, optical microscopy images using flow particle imaging are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is $C_E A/P$, where $C_E A$ is the circumference of a circle having the area equivalent to the area (A) of the actual particle. Herein, the circularity is based on three runs through a SYSMEX FPIA 3000 particle shape and particle size analyzer, where 6,000 to 10,000 particles are analyzed per run. The reported circularity is the median average circularity based on particle number. In the analysis, a threshold for distinguishing the greyscale levels between the background pixels and the particle pixels (e.g., to correct for non-uniform illumination conditions) was set at 90% of the background modal value.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by Carr Indices."

Aerated density ($\rho_{aer}$) is measured per ASTM D6393-14.
Bulk density ($\rho_{bulk}$) is measured per ASTM D6393-14.
Tapped density ($\rho_{tap}$) is measured per ASTM D6393-14.

Hausner ratio ($H_r$) is a measure of the flowability of a powder and is calculated by $H_r = \rho_{tap}/\rho_{bulk}$, where $\rho_{bulk}$ is the bulk density per ASTM D6393-14 and $\rho_{tap}$ is the tapped density per ASTM D6393-14.

As used herein, viscosity of carrier fluids are the kinematic viscosity at 25° C., unless otherwise specified, measured per ASTM D445-19. For commercially procured carrier fluids (e.g., polydimethylsiloxane oil (PDMS)), the kinematic viscosity data cited herein was provided by the manufacturer, whether measured according to the foregoing ASTM or another standard measurement technique.

The crystallization temperature is the temperature at which a polymer crystallizes (i.e., solidification) into a structured form, naturally or in an artificially initiated process, wherein atoms or molecules are highly organized into a crystal. The crystallization temperature may be measured by Differential Scanning Calorimetry (DSC). DSC provides a rapid method for determining polymer crystallinity based on the heat required to melt the polymer. The crystallization temperature (° C.) can be determined by ISO 11357 test method or ASTM D3417, for example.

The crystallinity (%) of a polymer, unless otherwise specified, is determined by the ASTM D3417 method, by quantifying the heat associated with melting (fusion) of the polymer.

The melt flow index (MFI) is the measure of resistance to flow of polymer melt under defined set of conditions (unit: g/10 min). Being a measure at low shear rate condition, MFI is inversely related to molecular weight of the polymer.

The dimensional accuracy of SLS part (%) is a quantitative measure of the accuracy of a 3D printed sintered parts of SLS.

As used herein, "tensile modulus" (MPa) of a solid material is a mechanical property that measures its stiffness. It is defined as the ratio of its tensile stress (force per unit area) to its strain (relative deformation) when undergoing elastic deformation. It can be expressed in Pascals or pounds per square inch (psi). ASTM D638-14 can be used to determine tensile modulus of a polymer.

CNM-g-Polymer Composites

CNM-g-polymer composites comprises one or more polymer grafted to one or more CNM. CNM-g-polymer composites may comprise a mixture of CNMs each having the same or different polymers grafted thereto. CNM-g-polymer composites may comprise a single CNM having one or more polymers grafted thereto. CNM-g-polymer composites may comprise a first CNM having a first polymer grafted thereto and a second CNM (the same or different than the first CNM) having a second polymer grafted thereto (the same or different than the first polymer) where (a) the first and second CNMs are different and/or (b) the first and second polymers are different.

Examples of CNM that may have a polymer grafted thereto include, but are not limited to, fullerenes, carbon nanotubes (e.g., single walled carbon nanotubes, double walled carbon nanotubes, multiwalled carbon nanotubes, and the like), graphite (e.g., graphite particles, highly-oxidized graphite particles, and the like), graphene (e.g., graphene particle, graphene ribbons, graphene sheets, and the like, and highly-oxidized derivatives thereof), and the like, and any combinations thereof.

Examples of polymers that may be grafted to CNMs include, but are not limited to, polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), ethylene vinyl acetate copolymer (EVA), ethylene propylene diene rubber (EPDM), ethylene-propylene elastomer (EPR), poly(4-methyl-1-pentene), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), thermoplastic polyolefins (e.g., polymers and copolymers derived from one or more $C_2$ to $C_{40}$ olefin monomers), functionalized or nonfunctionalized ethylene/vinyl monomer polymer, functionalized or nonfunctionalized ethylene/alkyl (meth)acrylates, functionalized or non-functionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate), polybutadienes, polyisoprenes, styrenic block copolymers, polyacrylonitriles, silicones, and the like, and any combination thereof. Copolymers comprising one or more of the foregoing may also be used in the methods and systems of the present disclosure.

The polymers that may be grafted to CNMs may be elastomeric or non-elastomeric. Some of the foregoing examples of thermoplastic polymers may be elastomeric or non-elastomeric depending on the exact composition of the polymer. For example, polyethylene that is a copolymer of ethylene and propylene may be elastomeric or not depending on the amount of propylene in the polymer.

Thermoplastic elastomers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Examples of thermoplastic elastomers can be found in Handbook of Thermoplastic Elastomers, 2nd ed., B. M. Walker and C. P. Rader, eds., Van Nostrand Reinhold, New York, 1988. Examples of thermoplastic elastomers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of: isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

The polymers that may be grafted to CNMs may be selected from the group consisting of polyacrylates, polybenzimidazoles, polycarbonates, polyether sulfones, polyaryl ether ketones, polyether ether ketone, polyetherimide, polyethylenes, poly(ethylene-co-vinylacetate), polyphenylene oxides, polypropylenes, polystyrenes (e.g., poly(styrene isoprene styrene), acrylonitrile butadiene styrene (ABS), poly(Styrene Ethylene Butylene Styrene) (SEBS), styrene n-butyl acrylate), styrene-butyl acrylate, polyesters, polyurethanes, polyamides, poly(vinylidene fluoride) (PVDF), poly(vinylidene fluoride-co-hexafluoropropylene), polyethylene terephthalate, polylactic acid (PLA), polycaprolactone, poly (propoxylated bisphenol A co-fumarate), polyvinyl chlorides, ethylene vinyl acetate copolymer (EVA), ethylene propylene diene rubber (EPDM), ethylene-propylene elastomer (EPR), poly(4-methyl-1-pentene), and combinations thereof.

Examples of polyamides include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecaamide (nylon 11, polyamide 11, or PA11), polydodecaamide (nylon 12, polyamide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), and the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10, 36, PA 11/6,36, PA 10,10/10,36, PA 6T/6,6, and the like, and any combination thereof. A polyamide followed by a first number comma second number is a polyamide having the first number of backbone carbons between the nitrogens for the section having no pendent =O and the second number of backbone carbons being between the two nitrogens for the section having the pendent =O. By way of nonlimiting example, nylon 6,10 is $[NH-(CH_2)_6-NH-CO-(CH_2)_8-CO]_n$. A polyamide followed by number(s) backslash number(s) are a copolymer of the polyamides indicated by the numbers before and after the backslash.

Examples of polyurethanes include, but are not limited to, polyether polyurethanes, polyester polyurethanes, mixed polyether and polyester polyurethanes, and the like, and any combination thereof. Examples of thermoplastic polyurethanes include, but are not limited to, poly[4,4'-methylenebis (phenylisocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

The CNM-g-polymer may comprise about 50 wt % to about 99.95 wt % (or about 55 wt % to about 95 wt %, or about 60 wt % to about 90 wt %, or about 65 wt % to about 85 wt %, or about 70 wt % to about 80 wt %) of the polymer, and about 0.05 wt % to about 50 wt % (or about 5 wt % to about 45 wt %, or about 10 wt % to about 40 wt %, or about 15 wt % to about 35 wt %, or about 20 wt % to about 30 wt %, or about 25 wt % to about 50 wt %) of the CNM, based on the total weight of the CNM-g-polymer.

The polymer may be grafted on surfaces of the carbon nanomaterial by any suitable method including, for example, in-situ polymerization, in-situ free radical functionalization, amidation reaction, polycondensation reactions, interfacial polymerization, in situ ring-opening polymerization (ROP) with lactams, microwave-assisted solid state grafting, and the like.

In a first series of nonlimiting examples, CNM-g-polyolefins are discussed.

By way of nonlimiting example, the polyolefin may be grafted on surfaces of the carbon nanomaterial by in-situ polymerization. The in-situ polymerization may be a polymerization filling technique (PFT). The in-situ polymerization may be carried out by pre-treating the carbon nanomaterial, wherein pre-treating comprises: contacting/binding a catalyst, and optionally a cocatalyst, on the surfaces of the carbon nanomaterial, and wherein the catalyst is a heterogeneous catalyst, a homogeneous metallocene catalyst, or a homogeneous non-metallocene catalyst.

The in-situ polymerization may be carried out using Ziegler-Natta catalyst. Alternately, the in-situ polymerization may be carried out using a metallocene catalyst, in the presence of a cocatalyst which may comprise aluminoxane. The aluminoxane may be present at a molar ratio of aluminum to catalyst compound transition metal of 100:1 or more (or about 100:1 to about 500:1, or about 200:1 to 300:1).

The polymerization processes of the present disclosure may comprise monomer (such as propylene), and optionally comonomer, wherein the said momomer/comonomer may be contacted with a catalyst system comprising an activator and at least one catalyst, as described above. The catalyst and activator may be combined in any order, and are combined typically prior to contacting with the monomer.

Monomers useful herein may include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. The monomer may comprise propylene and an optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

Further, the monomer may comprise ethylene and an optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

For example, methods of the present disclosure may comprise polymerizing in-situ the carbon nanomaterial with one or more of: ethylene, propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-cyclopentene, cyclohexene, norbornene, ethylidene-norbornene, vinylidene-norbornene, and combinations thereof.

In some cases, little or no aluminoxane is used in the process to produce the polymers. Preferably, aluminoxane is present at zero mol %, alternately the aluminoxane is present at a molar ratio of aluminum to transition metal less than 500:1, such as less than 300:1, such as less than 100:1, such as less than 1:1.

Further, little or no scavenger is used in the process to produce the ethylene polymer. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

Methods of the present disclosure may produce olefin polymers, preferably polyethylene and polypropylene homopolymers and copolymers. The polymers produced herein may be homopolymers of ethylene or propylene, may be copolymers of ethylene having from 0 to 25 mole % (alternately from 0.5 to 20 mole %, alternately from 1 to 15 mole %, preferably from 3 to 10 mole %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene), or may be copolymers of propylene preferably having from 0 to 25 mole % (alternately from 0.5 to 20 mole %, alternately from 1 to 15 mole %, preferably from 3 to 10 mole %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

The in-situ polymerization may be a metallocene/methylaluminoxane (MAO) catalyzed Polymerization Filling Technique (PFT), wherein the carbon nanomaterial is pretreated with MAO cocatalyst, followed by homopolymerization the monomer (e.g., ethylene or propylene) in the presence of the pretreated carbon nanomaterial with the MAO as cocatalyst and $Cp_2ZrCl_2$ as the catalyst.

In another nonlimiting example of in-situ polymerization, a Ziegler-Natta catalyst may be used as followed: a graphene oxide-supported Ziegler-Natta catalyst may be formed via Grignard Reagent (e.g., n-BuMgCl), and further treated with a Lewis acid (e.g., $TiCl_4$). The CNM-g-polyolefin may be produced via in-situ monomer (e.g., propylene) polymerization on the graphene oxide-supported Ziegler-Natta catalyst.

The in-situ polymerization may occur at a temperature of from about 0° C. to about 300° C., at a pressure in the range of from about 0.35 MPa to about 10 MPa, and at a time up to 300 minutes.

In another nonlimiting example, the polyolefin may be grafted on the carbon nanomaterial (e.g., carbon nanotubes (CNT), single-wall carbon nanotubes (SWCNT)) by in-situ free radical functionalization. The in-situ free radical functionalization may be carried out by melt compounding in the presence of peroxide initiators (e.g., benzoyl peroxide initiators). For example, a wet polypropylene pellets/powder with SWCNT may be suspended in chloroform to create an initial dispersion between polymer and SWCNT. A peroxide (e.g., benzoyl peroxide) may be further added to functionalize the SWCNT. The solvent may be removed by solvent evaporation, under reduced pressure, prior to initiate in-situ reaction at high-temperature high shear mixing in Haake (e.g., temperature ranging from about 100° C. to about 200° C.), enabling covalent bonding of SWCNT to the polymer.

In yet another nonlimiting example, the polyolefin may be grafted on the carbon nanomaterial (e.g., graphene oxide sheets (GOS)) by amidation reaction. The amidation reaction between graphene oxide and polyolefins may include: graphene oxide sheets covalently grafted to a polyolefin (e.g., polypropylene (PP)) by producing amine-modified graphene oxide such as $NH_2$-terminated GOS via nucleophilic substitution reaction of 4,4'-methylene dianiline with GOS. PP-g-GOS through grafting maleated PP on $NH_2$-t-GOS. For example, graphene oxide comprising polyolefin (e.g., polypropylene graphene oxide sheets PP-g-GOS) may be used as compatibalizers for polyolefin-based blends via a) solvent blending b) melt compounding. The graphene oxide (GO) may be prepared from natural graphite by a chemical conversion process from the carboxyl group of GO to acyl chloride bound GO via the introduction of thionyl chloride, method also referred to as the modified Hummers method.

In a second series of nonlimiting examples, CNM-g-polyamides are discussed.

Polyamides may be grafted on surfaces of the CNMs by polycondensation reactions, interfacial polymerization, or in situ ROP with lactams, to produce CNM-g-polyamide, as described in further detail herein.

For example, CNMs may be an amino-functionalized CNMs comprising one or more primary amine (e.g., CMN—$NH_2$) and/or one or more secondary amine (e.g., CMN-NRH wherein R is a $C_1$-$C_{20}$ alkyl group, such as methyl, ethyl, propyl, butyl, pentyl, hexyl, heptyl, octyl, nonyl, decyl, and isomers thereof, a $C_1$-$C_{20}$ cycloalkyl group, $C_1$-$C_{20}$ arylalkyl group), a carboxylic acid functionalized CNMs (e.g., CMN—COOH), amino acid functionalized CNMs (e.g., $NH_2$—CMN-COOH), an acid chloride functionalized CNMs (e.g., CMN-COCl), and the like, and any combination thereof. These functional groups may act as handles to either directly attach a polyamide to the CNM or to polymerize a polyamide from the handle where the resultant polymer is grafted to the CNM.

For example, functionalization of CMNs with carboxylic acid moieties may be carried out in presence of sulfuric acid, nitric acid, chlorate or ammonium persulfate oxidation. Alternately, functionalization of CMNs may be carried out by direct sulfonation, metalation, electrophilic addition to the deoxygenated surfaces of CNTs.

In another example, CNMs may be graphene oxide prepared from natural graphite via modified Hummers method and further functionalized into a carboxylic acid modified graphite oxide (GO—COOH) or an amino modified graphite oxide (GO-$NH_2$), for example. The carboxylic acid functionalized CNMs (e.g., carboxylic acid modified graphite oxide (GO—COOH)) may be conjugated with diamine monomers and/or dicarboxylic acid monomers via condensation reaction. CNM-g-polyamide may be formed via condensation reaction between diamine functionalized graphene oxide and dicarboxylic acid monomer. Suitable examples of diamines may include, but not limited to, ethylenediamine, 1,6-diaminohexane, p-phenylenediamine, propylamine, or butylamine.

In yet another example, the CNM-g-polyamide may be polyamide containing fullerene produced from a covalent reaction between functional polymers and fullerenes, or synthesizing polymers in the presence of fullerenes, wherein polymeric fullerenes may be prepared by: side-chain polymers, main-chain polymers, dendritic fullerenes, star-shaped polymers, fullerene end-capped polymers, and the like.

Herein, functionalized CNMs may be amino-functionalized $C_{60}$-based fullerenes, carboxamide-functionalized $C_{60}$-based fullerenes, for example. Fullerene-g-polyamide may be formed under mild conditions at room temperature, by reacting amino-functionalized $C_{60}$-based fullerenes with acid chloride functionalized polyamides, to form an amide bond between the $C_{60}$-primary and/or secondary amine.

In another nonlimiting example, the CNM-g-polyamide may be polyamide containing fullerene produced from polymer-bound $C_{60}$ using soluble amino polymers (e.g., $NH_2$ group from polyamide end groups or a monomer comprising branched amino group) capable of adding to fullerene double bonds. CNM-g-polyamide (e.g., $C_{60}$-g-polyamide) may be obtained by allowing the amino polymers to react with $C_{60}$ under mild conditions at room temperature. This method can be expanded to polyamides with incorporation of 1,2,3-propanetriamine as an added monomer to polyamide design so that $C_{60}$ can be covalently bonded to the polymer or else commodity polyamides such as PA6, PA11 or PA12 can be used for an end-capped reaction (—$NH_2$ end groups on PA), for example.

Examples of polyamides include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecaamide (nylon 11, polyamide 11, or PA11), polydodecaamide (nylon 12, polyamide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), and the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10, 36, PA 11/6,36, PA 10,10/10,36, PA 6T/6,6, and the like, and any combination thereof. A polyamide followed by a first number comma second number is a polyamide having the first number of backbone carbons between the nitrogens for the section having no pendent =O and the second number of backbone carbons being between the two nitrogens for the section having the pendent =O. By way of nonlimiting example, nylon 6,10 is [NH—$(CH_2)_6$—NH—CO—$(CH_2)_8$—CO]$_n$. A polyamide followed by number(s) backslash number(s) are a copolymer of the polyamides indicated by the numbers before and after the backslash.

Polycondensation reactions may be performed in the presence of (a) one or more polyamine monomers and one or more polyacid monomers, (b) one or more amino acid monomers, (c) one or more polyamine monomers and one or more amino acid monomers, (d) one or more polyacid monomers and one or more amino acid monomers, or (e) one or more polyamine monomers, one or more polyacid monomers, and one or more amino acid monomers. In some instances, at least one of any of said monomers may include at least one unsaturated, aliphatic carbon-carbon bond. As described above, functional groups on a CNM may be used as handles that participate in the polycondensation reaction such that the resultant polyamide is grafted to the CNM at said functional group.

Examples of amino acid polyamide monomers suitable for use in polycondensations include, but are not limited to, HN—(CH$_2$)$_n$—COOH where n is 1-20; branched aliphatic amino acids (e.g., C$_4$-C$_{20}$); cyclic-aliphatic amino acids (e.g., C$_4$-C$_{20}$); aromatic amino acids (e.g., 3-aminobenzoic acid, 4-aminobenzoic acid); and the like; and any combination thereof. Examples of amino acid polyamide monomers not having at least one unsaturated, aliphatic carbon-carbon bond suitable for use in polycondensations include, but are not limited to, HN—(CH$_2$)$_n$—COOH where n is 1-20; branched aliphatic amino acids (e.g., C$_4$-C$_{20}$); cyclic-aliphatic amino acids (e.g., C$_4$-C$_{20}$); aromatic amino acids (e.g., 3-aminobenzoic acid, 4-aminobenzoic acid); and the like; and any combination thereof. Examples of amino acid polyamide monomers having at least one unsaturated, aliphatic carbon-carbon bond include, but are not limited to, maleamic acid; N-propylmaleamic acid; and the like; and any combination thereof.

Examples of polyacid polyamide monomers suitable for use in polycondensations include, but are not limited to, HOOC—(CH$_2$)$_n$—COOH where n is 1-20 (e.g., adipic acid, terephthalic acid, isophthalic acid, pimelic acid, suberic acid, decanedioic acid, dodecanedioic acid); isophthalic acid; terephthalic acid; pent-2-enedioic acid; dodec-2-enedioic acid; succinic acid; glutaric acid; adipic acid; pimelic acid; suberic acid; azeleic acid; sebacic acid; undecanedioic acid; dodecanedioic acid; 1,3-cyclohexanedicarboxylic acid; and the like; and any combination thereof. Examples of polyacid polyamide monomers not having at least one unsaturated, aliphatic carbon-carbon bond suitable for use in polycondensations include, but are not limited to, HOOC—(CH$_2$)$_n$—COOH where n is 1-20 (e.g., adipic acid, terephthalic acid, isophthalic acid, pimelic acid, suberic acid, decanedioic acid, dodecanedioic acid); isophthalic acid; terephthalic acid; pent-2-enedioic acid; dodec-2-enedioic acid; succinic acid; glutaric acid; adipic acid; pimelic acid; suberic acid; azeleic acid; sebacic acid; undecanedioic acid; dodecanedioic acid; 1,3-cyclohexanedicarboxylic acid; and the like; and any combination thereof. Examples of polyacid polyamide monomers having at least one unsaturated, aliphatic carbon-carbon bond include, but are not limited to, fumaric acid; maleic acid; glutaconic acid; aconitic acid; itaconic acid; and the like; and any combination thereof.

Examples of polyamine polyamide monomers suitable for use in polycondensations include, but are not limited to, HN—(CH$_2$)$_n$—NH where n is 1-20; 1,5-diamino-2-methylpentane; 1,2-diaminopropane; trimethylhexamethylenediamine; 2-methyloctane-1,8-diamine; n-methyl 1,6-hexamethylene diamine where n is 2 or 3; n-methyl 1,7-heptamethylene diamine where n is 2-4; n-methyl 1,8-octamethylene diamine where n is 2-4; n-methyl 1,12-dodecamethylene diamine where n is 2-6; 1,3-bis(aminomethyl)benzene; ortho-phenylene-bis(methylamine); 1,4-bis(aminomethyl)benzene; 1,4-cyclohexanediamine; 4-methylcyclohexane-1,3-diamine; 4-methylcyclohexane-1,3-diamine; diphenylethylenediamine; 1,3-bis(aminomethyl)cyclohexane; 4,4'-methylenebis(cyclohexylamine); 4,4'-biphenyldiamine; 1,8-diaminonaphthalene; and the like; and any combination thereof. Examples of polyamine polyamide monomers not having at least one unsaturated, aliphatic carbon-carbon bond suitable for use in polycondensations include, but are not limited to, HN—(CH$_2$)$_n$—NH where n is 1-20; 1,5-diamino-2-methylpentane; 1,2-diaminopropane; trimethylhexamethylenediamine; 2-methyloctane-1,8-diamine; n-methyl 1,6-hexamethylene diamine where n is 2 or 3; n-methyl 1,7-heptamethylene diamine where n is 2-4; n-methyl 1,8-octamethylene diamine where n is 2-4; n-methyl 1,12-dodecamethylene diamine where n is 2-6; 1,3-bis(aminomethyl)benzene; ortho-phenylene-bis(methylamine); 1,4-bis(aminomethyl)benzene; 1,4-cyclohexanediamine; 4-methylcyclohexane-1,3-diamine; 4-methylcyclohexane-1,3-diamine; diphenylethylenediamine; diphenylethylenediamine; 1,3-bis(aminomethyl)cyclohexane; 4,4'-methylenebis(cyclohexylamine); 4,4'-biphenyldiamine; 1,8-diaminonaphthalene; and the like; and any combination thereof. Examples of polyamine polyamide monomers having at least one unsaturated, aliphatic carbon-carbon bond include, but are not limited to, 1,4-diamino-2-butene; 1,5-bis(3-aminophenyl)-1,4-pentadiene-3-one (DADBA); trans-4-cyclohexene-1,2-diamine; and the like; and any combination thereof.

Polycondensation reactions may be performed in the presence of an activator and/or metal salts. Examples of activators include, but are not limited to, triphenyl phosphine; and the like; and any combination thereof. Examples of metal salts include, but are not limited to, calcium chloride; cesium fluoride; and the like; and any combination thereof.

Polycondensation reactions may be performed at about 50° C. to about 200° C. (or about 50° C. to about 100° C., or about 75° C. to about 150° C., or about 125° C. to about 200° C.).

Polycondensation reactions may be performed for about 5 minutes to about 24 hours (or about 5 minutes about 6 hours, or about 2 hours to about 12 hours, or about 6 hours to about 24 hours).

Polycondensation reactions may be performed in a solvent that includes, but is not limited to, N-methyl pyrrolidone (NMP), pyridine, dichloromethane, dimethyl sulfoxide (DMSO), N,N-dimethylformamide, acetonitrile, tetrahydrofuran, and the like, and any combination thereof.

Polycondensation reactions may be performed with a molar ratio of polyamide monomers to CMN of about 500:1 to about 1:500 (or about 500:1 to about 100:1, or about 250:1 to about 50:1, or about 100:1 to about 10:1, or about 50:1 to about 1:1, or about 25:1 to about 1:25, or about 1:1 to about 1:50, or about 1:10 to about 1:100, or about 1:50 to about 1:250, or about 1:100 to about 1:500). In some cases, the polycondensation reactions may be performed with a molar ratio of polyamide monomers to CMN of about 100:1 to about 0.5:1, or about 50:1 to about 5:1, or about 20:1 to about 10:1.

In another nonlimiting example, polyamides of the present disclosure may be grafted via ring-opening polymerization (ROP), such as in situ anionic ring-opening polymerization (AROP) of CNMs. The said CNMs may be covalently functionalized with copolymers (e.g., styrene maleic anhydride). Herein, AROP may be carried out at a temperature ranging from about 50° C. to about 150° C., and/or at a reaction time of about 60 min or less, such as about 40 min or less, such as about 20 min or less, such as from 5 min to 60 min, thus by using an initiator (e.g., caprolactam magnesium bromide) in combination with an activator. Examples of activators may include, but are not limited to, dicarbamoylcaprolactam (e.g., difunctional hexamethylene-1,6-dicarbamoylcaprolactam); and the like.

Examples of cyclic polyamide monomers suitable for use in ring-opening polymerization include, but are not limited to, azeridinone, 2-azetidinone, 2-pyrrolidinone, 2-piperidinone, F-caprolactam, 2-azacyclooctanone, 2-azacyclononanone, 2-azacyclodecanone, 2-azacycloundecanone, 2-aza-cyclododecanone, laurolactam, butyrolactam, pivalolactam, F-caprolactam, caprylolactam, enantholactam, undecanonelactam, laurolactam (dodecanolactam), caprolactam magnesium bromide, and the like, and any combination thereof.

Ring-opening polymerization reactions may be performed in the presence of an activator and/or metal salts. Examples of activators include, but are not limited to, triphenyl phosphine, or hexamethylene-1,6-dicarbamoylcaprolactam; and the like; and any combination thereof. Examples of metal salts include, but are not limited to, calcium chloride; cesium fluoride; and the like; and any combination thereof.

Ring-opening polymerization reactions may be performed at room temperature to about 200° C. (or room temperature to about 150° C., or about 50° C. to about 100° C., or about 75° C. to about 150° C., or about 125° C. to about 200° C.).

Ring-opening polymerization reactions may be performed for about 5 minutes to about 24 hours (or about 5 minutes about 6 hours, or about 2 hours to about 12 hours, or about 6 hours to about 24 hours).

Ring-opening polymerization reactions may be performed in a solvent that includes, but is not limited to, N-methyl pyrrolidone (NMP), pyridine, dichloromethane, dimethyl sulfoxide (DMSO), N,N-dimethylformamide, acetonitrile, tetrahydrofuran, and the like, and any combination thereof.

Ring-opening polymerization reactions may be performed with a molar ratio of polyamide monomers to CMN of about 500:1 to about 1:500 (or about 500:1 to about 100:1, or about 250:1 to about 50:1, or about 100:1 to about 10:1, or about 50:1 to about 1:1, or about 25:1 to about 1:25, or about 1:1 to about 1:50, or about 1:10 to about 1:100, or about 1:50 to about 1:250, or about 1:100 to about 1:500). In some cases, the polycondensation reactions may be performed with a molar ratio of polyamide monomers to CMN of about 100:1 to about 0.5:1, or about 50:1 to about 5:1, or about 20:1 to about 10:1. The more polyamide monomers having at least one unsaturated, aliphatic carbon-carbon bond included in the polycondensation reaction, the more locations for possible crosslinking.

The CNM-g-polyamide of the present disclosure may be produced via interfacial polymerization, wherein the polymerization process occurs at the interface between two immiscible phases (e.g., the CMN and the polyamide) resulting in a polymer that is constrained to the interface. CNM-g-polyamide composites comprising polyamides (e.g., nylon 6,6) grafted to CNMs (e.g., MWCNT) may be produced from polyamides (e.g., nylon 6,6) and acyl chloride grafted CMNs "CMNs-COCl" (e.g., acyl chloride grafted MWCNT "MWCNT-COCl") by reactive extrusion. CMNs-COCl may be produced by reacting acid treated CMNs with thionyl chloride. Formation of CNM-g-polyamide (e.g., nylon 6,6-g-MWCNT) by reactive extrusion may be analysed/confirmed by Fourier transform infrared spectroscopy, X-ray photoelectron spectroscopy, thermogravimetric analysis, and scanning electron microscopy. To quantify the interfacial adhesion energies of the polyamide (e.g., nylon 6,6) and pristine and functionalized CMNs (e.g., pristine and functionalized MWCNTs), the contact angles of cylindrical drop-on-fiber systems may be determined by using the generalized droplet shape analysis. In at least one embodiment, the interfacial adhesion energy of the polyamide/CNM-g-polyamide (e.g., nylon 6,6/nylon 6,6-g-MWCNT composite) is greater than that of the polyamide/pristine CNM-g-polyamide (e.g., nylon 6,6/pristine MWCNT composite). The CNM-g-polyamides (e.g., Nylon 6,6-g-MWCNTs) exhibit excellent dispersion in the composite, whereas pristine CNM-g-polyamides (e.g., pristine MWCNTs) exhibit poor dispersion when composite films are prepared by solvent casting. The reinforcement level of the composite increase with increasing CMNs content (e.g., MWCNT content).

In a third series of nonlimiting examples, CNM-g-polyurethanes are discussed.

CNMs may be an amino-functionalized CNMs comprising one or more primary amine (e.g., CMN—$NH_2$) and/or one or more secondary amine (e.g., CMN-NRH wherein R is a $C_1$-$C_{20}$ alkyl group, such as methyl, ethyl, propyl, butyl, pentyl, hexyl, heptyl, octyl, nonyl, decyl, and isomers thereof, a $C_1$-$C_{20}$ cycloalkyl group, $C_1$-$C_{20}$ arylalkyl group), a carboxylic acid functionalized CNMs (e.g., CMN—COOH), amino acid functionalized CNMs (e.g., $NH_2$—CMN-COOH), an acid chloride functionalized CNMs (e.g., CMN-COCl), a hydroxyl functionalized CNMs (e.g., CMN-OH), and the like, and any combination thereof. In some cases, functionalization of CMNs (e.g., CNTs) with carboxylic acid moieties may be carried out in presence of sulfuric acid, nitric acid, chlorate or ammonium persulfate oxidation. Alternately, functionalization of CMNs (e.g., CNTs) may be carried out by direct sulfonation, metalation, electrophilic addition to the deoxygenated surfaces of CNTs.

Grafting of polyurethanes on the surface of the CNMs may be carried out via in situ polymerization, under inert atmosphere (e.g., $N_2$ or Ar). Polyurethanes may be synthesized by a polyaddition reaction of diisocyanates with diols, in presence of an organocatalyst (e.g., an organotin catalyst, an organic tertiary amine combined with organotin catalyst, or N-heterocyclic carbenes (NHCs)). Herein, diisocyanates, polyols, and chain extenders may be used at a molar ratio ranging from about 5:0.1:0.1 to about 1:1:1, such as 1:0.5:0.5, for example (the molar ratio may be modified to obtain different properties); a pre-polymer may be prepared by reacting the diisocyanate (e.g., 4,4'-methylene bis(phenylisocyanate) (MDI)) with the polyol (e.g., polyetherpolyol) at a temperature ranging from about 50° C. to about 120° C. (preferably 80° C.). Solvents, such as organic solvents miscible with the organic reactants used herein (e.g., dimethylformamide (DMF)) may be used herein. Conversion of —OH groups may be monitored/analyzed by titration of NCO groups. A diol (e.g., 1,4-butanediol) and a catalyst (e.g., organotin catalyst such as dibutyltin dilaurate catalyst) may be added to the reaction vessel, enabling the chain extension, The CNM (preferably functionalized CNM) may then be added to the reaction vessel. The resulting slurry mixture may then be poured into a mold to evaporate the solvent. Any residual solvent may be removed by placing the polymer product in a vacuum oven at a temperature ranging from about 25° C. to about 100° C. (preferably 50° C.). Notwithstanding, the CNM may be added prior to the addition of the polyol, prior to the addition of the chain extender, or after the completion of the polymerization.

Herein, CNMs may be graphene oxide prepared from natural graphite via modified Hummers method and further functionalized into a carboxylic acid modified graphite oxide (GO-COOH) or an amino modified graphite oxide (GO-$NH_2$), for example. The carboxylic acid functionalized CNMs (e.g., carboxylic acid modified graphite oxide (GO—COOH)) may be conjugated with diamine monomers and/or dicarboxylic acid monomers via condensation reaction. CNM-g-polyurethane may be formed via condensation reaction between diamine functionalized graphene oxide and dicarboxylic acid monomer. Suitable examples of diamines may include, but not limited to, ethylenediamine, 1,6-diaminohexane, p-phenylenediamine, propylamine, or butylamine. CNMs may be thermally reduced GO (rGO)

prepared from natural graphite via modified Hummers method followed by thermal reduction of GO.

The CNM-g-polyurethane may be polyurethane containing GO produced from a covalent reaction between polyurethanes (e.g., TPU) and GOs, or synthesizing polyurethanes in the presence of GOs.

For example, CNM-g-polyurethane wherein CNM is a GO may be formed as follow: diisocyanate, polyol and chain extender may be combine at various molar ratio, such as a molar ratio ranging from about 5:0.1:0.1 to about 1:1:1 (preferably 1:0.5:0.5), for example. Poly(tetrahydrofuran), 4,4'-methylene diphenyl diisocyanate (MDI) may be mixed, and the resulting mixture heated at a temperature ranging from about 50° C. to about 120° C. (preferably 80° C.), thus forming a prepolymer. In a separate reaction vessel, GO may be mixed in an organic solvent that may be miscible with water (e.g., dimethylformamide (DMF)), then sonicated to give a stable dispersion of GO. Then, a diol (e.g., 1,4-butanediol) and a catalyst (e.g., dibutyltinlaurate catalyst) may be added to the reaction vessel at a temperature ranging from about 50° C. to about 120° C. (preferably 80° C.) under continued inert atmosphere (e.g., argon), enabling the chain extension. The reaction may be vigorously stirred for about 30 minutes to 5 hours, and the viscous mixture may then be poured into a Teflon lined mold and/or under vacuum to evaporate any remaining solvent, thus affording the graphene oxide-grafted-polyurethane.

The CNM-g-polyurethane may be produced from an isocyanate-functionalized CNM (e.g., an isocyanate-functionalized GO), wherein the isocyanate-functionalized CMN may be grafted with polyurethanes (e.g., TPU) via in situ polymerization. The said grafting process may be carried out under inert atmosphere (e.g., $N_2$ or Ar). The isocyanate-functionalized CNMs may be prepared as follow: CNM (e.g., GO) may be first dispersed in water via ultrasonication for 5 minutes to 10 hours (or 30 minutes to 5 hours, or 1 hour to 3 hours), followed by centrifugation at 500 rpm to 10,000 rpm (or 1,000 rpm to 5,000 rpm, or 2,000 rpm to 4,000 rpm). The CNM suspension (e.g., GO suspension) may then be subjected to a solvent-exchange process to obtain a dispersion of CNM (e.g., GO) in an organic solvent such as DMF. The solvent-exchange process may be performed by adding the organic solvent (e.g., DMF) to the aqueous CNM (e.g., GO), followed by ultrasonication, centrifugation, and then removal of the supernatant liquid. This process may be repeated several times. The CNM (e.g., GO) may then be suspensed again in an organic solvent (e.g., DMF) and reacted with a polyisocyanate (PI), such as an aliphatic polyisocyanate (e.g., DESMODUR® N75), to produce the isocyanate-functionalized CNM (e.g., isocyanate-functionalized GO). The polyisocyanate-functionalized CNM product (e.g., polyisocyanate-functionalized graphene oxide (PI-GO)) may then be coagulated (using an organic solvent such as dichloromethane), filtered, washed, and dried.

Methods for grafting the polyisocyanate-functionalized CNM product (e.g., PI-GO) to polyurethanes (e.g., TPU, or polyurethane prepolymer) via in situ polymerization may comprise: dispersing the polyisocyanate-functionalized CNM product (e.g., PI-GO) in an organic solvent (e.g., DMF) via ultrasonication of the said polyisocyanate-functionalized CNM product to produce a homogenous solution; transferring the homogeneous solution in a separate vessel and adding a diisocyanate (e.g., 4,4'-methylene bis(phenylisocyanate) (MDI)) and a polyglycol (e.g., poly(tetrahydrofuran)) at a molar ratio ranging from of 1:0.1 to 1:1 (preferably 1:0.5), with an organic solvent (e.g., dry DMF). The reaction mixture may be heated at a temperature ranging from about 50° C. to about 120° C. (preferably 80° C.) for 30 minutes or more (or 1 hour or more, or 2 hours or more, or 3 hours or more, or 4 hours or more, or 5 hours or more). A diol (e.g., 1,4-butanediol) and a catalyst suitable to polymerize the polyurethanes (e.g., dibutyltinlaurate catalyst) may be added to the reaction vessel. Upon completion, the reaction vessel may be degassed via vacuum, and the resulting slurry (viscous polymer solution) may be poured into an aluminum pan to evaporate the solvent.

The CNM-g-polyurethane may be polyurethane containing CNTs (e.g., single walled carbon nanotubes (SWCNT), multi-walled (MWCNT), or double-walled (DWCNT)) produced from a covalent reaction between polyurethanes (e.g., TPU) and CNTs, or synthesizing polyurethanes in the presence of CNTs. Other nonlimiting examples of suitable methods to evaporate the solvent may include precipitation of polymer, spray drying, thin film evaporation, rotary evaporation.

The CNM-g-polyurethane may be produced from a functionalized CNM (e.g., COOH-functionalized CNT), wherein the functionalized CMN may be grafted with polyurethanes (e.g., TPU) via microwave-assisted solid state grafting. Methods for grafting the COOH-functionalized CNM product (e.g., COOH-CNT) to polyurethanes via microwave-assisted solid state may comprise: (a) prior to synthesizing the CNM-g-polyurethane polymer composite, forming the carboxyled CNTs by acid-treating the CNTs in a mixture of concentrated acid (e.g., concentrated acid mixture of sulfuric acid and nitric acid, at a ratio of 3:1 to 1:1) via microwave radiation at a temperature ranging from about 100° C. to about 200° C. (preferably from about 120° C. to about 150° C., such as 140° C. for example) for 1 minute or more (or 5 minutes or more, or 10 minutes or more, or 15 minutes or more, or 20 minutes or more, or 25 minutes or more, or 30 minutes or more). After the acid treatment, the CNTs may be transferred into a separate vessel, followed by the addition of deionized (DI) water, and the mixture cooled down to room temperature. The oxidized product may be filtered using a Teflon membrane and resulting carboxylated CNT products may be washed with DI water until a neutral pH is reached, and then dried in a vacuum oven; (b) grafting of carboxylated CNTs via microwave radiation (at 0.5 wt % CNTs or greater, at 1 wt % CNTs or greater, at 5 wt % CNTs or greater, at 10 wt % CNTs or greater) by dispersing the carboxylated CNTs in an organic solvent (e.g., THF) via ultrasonication. In a separate container, polyurethanes may be dissolved the same organic solvent (e.g., THF), and the well-dispersed carboxylated CNTs may be added dropwise to the polyurethane solution with stirring until a homogenous mixture can be obtained. The mixture may then be poured into a mold and the solvent evaporated. The mixture of polyurethanes and carboxylated CNTs can then be treated under microwave radiation for 1 minute or more (or 5 minutes or more, or 10 minutes or more, or 15 minutes or more, or 20 minutes or more, or 25 minutes or more, or 30 minutes or more), with a total power output of about 10% or greater (or 20% or greater, or 30% or greater, or 40% or greater, or 50% or greater) of 500 W to 1,000 W, preferably 50% of 800 W.

In some cases, methods for producing CNM-g-polyurethane may comprise: (a) oxidizing CNM (e.g., CNTs) to produce carboxyl-functionalized CNMs (e.g., COOH-CNTs); (b) acid chloride functionalization of the carboxyl-functionalized CNMs surface (e.g., COOH-CNTs surface) in presence of thionyl chloride ($SOCl_2$) with ultrasonication to produce acyl chloride functionalized CMNs (e.g., ClCO-CNTs); (c) grafting the acid chloride functionalization of the CMNs to polyol (e.g., poly(ε-caprolactone) (PCL)-diol) to produce polyol functionalized CMNs; and (d) grafting the polyol functionalized CMNs to polyurethanes via in situ polymerization to produce CNM-g-polyurethanes (the material may also be used to endcap the polymer if added after the completion of the polymerization, and the isocyanate groups are present in excess).

In some other cases, methods for producing CNM-g-polyurethane may comprise an in situ polymerization with amine-functionalized CNMs (e.g., amine-modified carbon sources such as $H_2N$-CNTs). Preparation of amino-functionalized CNMs (e.g., amino-functionalized CNTs such as $H_2N$-MWCNT) may comprise: oxidizing CNMs via acid-treating the CNMs with a mixture of concentrated acid (e.g., concentrated acid mixture of sulfuric acid and nitric acid, at a ratio of 3:1 to 1:1). The acidification may take place with sonication of the CNMs in the acid solution at a temperature ranging from about 30° C. to about 100° C. (preferably 50° C.). The CNMs/acid mixture may then be poured into deionized water, filtered, and washed repeatedly until the pH value of the filtration solution would be around 7 (neutral pH). The acidified CNM product may then be dried in a vacuum oven. The resulting CNMs-COOH may be dispersed in an organic solvent (e.g., THF) under sonication for at least 1 hour. To this dispersion, while stirring at ambient temperature, may be added ethylenediamine (EDA), 4-(dimethylamino)pyridine (DMAP), N,N'-dicyclohexylcarbodiimide (DCC). The dispersion/solution may be heated at a temperature ranging from about 30° C. to about 100° C. (preferably 60° C.) maintained for 12 hours to 24 hours with stirring. The product may be a black solid that may be collected easily and washed with an organic solvent (e.g., THF). The product may be dried in a vacuum oven to obtain the amine-functionalized CNMs. Then, grafting the amine-functionalized CNMs to TPU via in situ polymerization may comprise: dispersing the amine-functionalized CNMs in dry DMF via ultrasonication to produce a homogenous solution; transferring the homogeneous solution to a separate vessel and disperse the amine-functionalized CNMs in dry DMF via ultrasonication. MDI and poly(tetrahydrofuran) may be added, and the reaction may be carried out at a temperature ranging from about 30° C. to about 100° C. (preferably 80° C.) for 1 hour or more (or 2 hours or more, or 3 hours or more, or 5 hours or more, or 10 hours or more). Then a diol (e.g., 1,4-butane diol) and a catalyst suitable for polymerization of TPU (e.g., dibutyltinlaurate catalyst) may be added. The solvent of the resulting slurry may then be evaporated.

The CNM-g-polyurethane may be polyurethane containing fullerene produced from a covalent reaction between functional polymers and fullerenes, or synthesizing polymers in the presence of fullerenes, wherein polymeric fullerenes may be prepared by: side-chain polymers, main-chain polymers, dendritic fullerenes, star-shaped polymers, fullerene end-capped polymers, and the like. Herein, functionalized CNMs may be amino-functionalized $C_{60}$-based fullerenes, carboxyamide-functionalized $C_{60}$-based fullerenes, for example. Fullerene-g-polyurethane may be formed under mild conditions at room temperature, by reacting amino-functionalized $C_{60}$-based fullerenes with acid chloride functionalized polyurethanes, to form an amide bond between the $C_{60}$-primary and/or secondary amine.

In another nonlimiting example, the CNM-g-polyurethane may be polyurethane containing fullerene produced from polymer-bound $C_{60}$ using soluble amino polymers (e.g., $NH_2$ group from polyurethane end groups or a monomer comprising branched amino group) capable of adding to fullerene double bonds. CNM-g-polyurethane (e.g., $C_{60}$-g-polyurethane) may be obtained by allowing the amino polymers to react with $C_{60}$ under mild conditions at room temperature.

In another nonlimiting example, the CNM-g-polyurethane may be polyurethane containing hydroxyl-functionalized fullerene produced from (a) surface modification of fullerene $C_{60}$ via acid-mediated oxidation of the fullerene (e.g., treating the pristine fullerene with concentrated $HNO_3$) to produce the hydroxyl-functionalized fullerene, which may be washed with distilled water until a neutral pH is reached, and dried under vacuum to remove any residual solvent, thus affording a hydroxyl-functionalized fullerene powder which may then be used in the polymerization reaction; (b) grafting the hydroxyl-functionalized fullerene to TPU via in situ polymerization. Depending on when the hydroxyl-functionalized fullerene may be added to the polymerization, the material may be used to graft to the polymer backbone or to endcap the polymer chains.

CNM-g-Polymer Particles and Methods of Making

CNM-g-polymers of the present disclosure may be used for producing spherical microparticles, pellets, or filaments. The spherical microparticles (or powder) comprising CNM-g-polymers of the present disclosure may be used in a three-dimensional (3D) printing technique by selective laser sintering (SLS), whereas the filaments or pellets comprising CNM-g-polymers of the present disclosure may be used in a three-dimensional (3D) printing technique by fused filament fabrication (FFF).

The methods and compositions described herein relate to highly spherical polymer particles that comprise CNM-g-polymer. Without being limited by theory, it is believed that having the thermoplastic polymer grafted to the CNM aids in a more homogeneous distribution of the CNM in the polymer particles, which results in a more homogeneous distribution in objects (or portions thereof) produced by additive manufacturing methods using said polymer particles.

For example, the present disclosure includes methods that comprise: mixing a mixture comprising: (a) a CNM-g-polymer, (b) a carrier fluid that is immiscible with the polymer of the CNM-g-polymer, optionally (c) a thermoplastic polymer (which may be the same or different than the polymer of the CNM-g-polymer) not grafted to a CNM, and optionally (d) an emulsion stabilizer at a temperature greater than a melting point or softening temperature of the polymer and at a shear rate sufficiently high to disperse the CNM-g-polymer in the carrier fluid; cooling the mixture to below the melting point or softening temperature of the polymer to form spherical polymer particles; and separating the spherical polymer particles from the carrier fluid.

FIG. 1 is a flow chart of a nonlimiting example method 100 of the present disclosure. CNM-g-polymer 102, carrier fluid 104, optionally emulsion stabilizer 106, and optionally thermoplastic polymer not grafted to a CNM 108 (e.g., the polymer of the CNM-g-polymer 102, a polymer not of the CNM-g-polymer 102, another thermoplastic polymer, or any combination thereof) are combined 110 to produce a mixture 112. The components 102, 104, 106, and 108 can be added individually or in a blend of components in any order and include mixing and/or heating during the process of combining 110 the components 102, 104, 106, and 108. For example, the CNM-g-polymer 102 and the thermoplastic polymer not grafted to a CNM 108, if included, may be premixed before combining 110. Herein, the polymer of the CNM-g-polymer refers to the v if not grafted to a CNM.

The mixture 112 is then processed 114 by applying sufficiently high shear to the mixture 112 at a temperature greater than the melting point or softening temperature of (a) the polymer of the CNM-g-polymer 102 or (b) thermoplastic polymer not grafted to a CNM 108, whichever is greater to form a melt emulsion 116. Because the temperature is above the melting point or softening temperature of polymeric portions of the mixture 112 (i.e., the polyurethane of the CNM-g-polymer 102 and, if included, thermoplastic polymer not grafted to a CNM 108), a polymer melt forms that comprises the CNM-g-polymer 102 and, if included, thermoplastic polymer not grafted to a CNM 108. The shear rate should be sufficient enough to disperse the polymer melt (e.g., comprising the CNM-g-polymer) in the carrier fluid 104 as droplets (i.e., the polymer emulsion 116). Without being limited by theory, it is believed that, all other factors being the same, increasing shear should decrease the size of the droplets of the polymer melt in the carrier fluid 104. However, at some point there may be diminishing returns on increasing shear and decreasing droplet size or there may be disruptions to the droplet contents that decrease the quality of particles produced therefrom.

The melt emulsion 116 inside and/or outside the mixing vessel is then cooled 118 to solidify the polymer droplets into CNM-g-polymer particles 124. The term "CNM-g-polymer particles" refers to polymer particles comprising the CNM-g-polymer 102 and may include other components in the polymer particles (e.g., the thermoplastic polymer not grafted to a CNM 108).

The cooled mixture 120 can then be treated 122 to isolate the CNM-g-polymer particles 124 from other components 126 (e.g., the carrier fluid 104, excess emulsion stabilizer 106, and the like) and wash or otherwise purify the CNM-g-polymer particles 124. The CNM-g-polymer particles 124 comprise the CNM-g-polymer 102 and the thermoplastic polymer not grafted to a CNM 108, when included, and at least a portion of the emulsion stabilizer 106, when included, coating the outer surface of the CNM-g-polymer particles 124. Emulsion stabilizers 106, or a portion thereof, may be deposited as coating, perhaps a uniform coating, on the CNM-g-polymer particles 124. In some instances, which may be dependent upon non-limiting factors such as the temperature (including cooling rate), the type of CNM-g-polymer 102, and the types and sizes of emulsion stabilizers 106, the nanoparticles of emulsion stabilizers 106 may become at least partially embedded within the outer surface of CNM-g-polymer particles 124. Even without embedment taking place, at least a portion of the nanoparticles within emulsion stabilizers 106 may remain robustly associated with CNM-g-polymer particles 124 to facilitate their further use. In contrast, dry blending already formed polymer particulates (e.g., formed by cryogenic grinding or precipitation processes) with a flow aid like silica nanoparticles does not result in a robust, uniform coating of the flow aid upon the polymer particulates.

The CNM-g-polymer particles 124 may optionally be further purified 128 (described in more detail below) to yield purified CNM-g-polymer particles 130.

The carrier fluid should be chosen such that at the various processing temperatures (e.g., from room temperature to process temperature) the CNM-g-polymer and the carrier fluid are immiscible. An additional factor that may be considered is the differences in (e.g., a difference or a ratio of) viscosity at process temperature between the CNM-g-polymer and the carrier fluid. The differences in viscosity may affect droplet breakup and particle size distribution. Without being limited by theory, it is believed that when the viscosities of the CNM-g-polymer and the carrier fluid are too similar, the circularity of the product as a whole may be reduced where the particles are more ovular and more elongated structures are observed.

The CNM-g-polymer 102 may be present in the mixture 112 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the CNM-g-polymer 102, the thermoplastic polymers not grafted to a CNM 108, and the carrier fluid 104 combined. When the thermoplastic polymers not grafted to a CNM 108 is included, CNM-g-polymer 102 and the thermoplastic polymers not grafted to a CNM 108 combined may be present in the mixture 112 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the CNM-g-polymer 102, the thermoplastic polymers not grafted to a CNM 108, and the carrier fluid 104 combined. When included, the weight ratio of the CNM-g-polymer 102 to the thermoplastic polymers not grafted to a CNM 108 may be about 10:90 to about 99:1 (or about 10:90 to about 50:50, or about 25:75 to about 75:25, or about 50:50 to about 99:1, or about 80:20 to about 99:1).

Examples of thermoplastic polymers not grafted to a CNM 108 may include, but are not limited to, polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), ethylene vinyl acetate copolymer (EVA), ethylene propylene diene rubber (EPDM), ethylene-propylene elastomer (EPR), poly(4-methyl-1-pentene), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate), polybutadienes, polyisoprenes, styrenic block copolymers, polyacrylonitriles, silicones, and the like, and any combination thereof. Copolymers comprising one or more of the foregoing may also be used in the methods and systems of the present disclosure. In some cases, copolymers of PE with polar monomers, such as poly(ethylene-co-vinyl acetate), poly(ethylene-co-methyl acrylate), poly(ethylene-co-glycidyl methacrylate), and poly(ethylene-co-vinyl alcohol) may improve compatibility in polyethylene-poly(methylmethacrylate) (PE/PMMA) blends.

The thermoplastic polymers not grafted to a CNM 108 in the compositions and methods of the present disclosure may be elastomeric or non-elastomeric. Some of the foregoing examples of thermoplastic polymers may be elastomeric or non-elastomeric depending on the exact composition of the polymer. For example, polyethylene that is a copolymer of ethylene and propylene may be elastomeric or not depending on the amount of propylene in the polymer.

Thermoplastic elastomers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Examples of thermoplastic elastomers can be found in Handbook of Thermoplastic Elastomers, 2nd ed., B. M. Walker and C. P. Rader, eds., Van Nostrand Reinhold, New York, 1988. Examples of thermoplastic elastomers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of: isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof.

The thermoplastic polymer not grafted to a CNM may be selected from the group consisting of polyacrylates, polybenzimidazoles, polycarbonates, polyether sulfones, polyaryl ether ketones, polyether ether ketone, polyetherimide, polyethylenes, poly(ethylene-co-vinylacetate), polyphenylene oxides, polypropylenes, polystyrenes (e.g., poly(styrene isoprene styrene), acrylonitrile butadiene styrene (ABS), poly(Styrene Ethylene Butylene Styrene) (SEBS), styrene n-butyl acrylate), styrene-butyl acrylate, polyesters, polyurethanes, polyamides, poly(vinylidene fluoride) (PVDF), poly(vinylidene fluoride-co-hexafluoropropylene), polyethylene terephthalate, polylactic acid (PLA), polycaprolactone, poly (propoxylated bisphenol A co-fumarate), polyvinyl chlorides, ethylene vinyl acetate copolymer (EVA), ethylene propylene diene rubber (EPDM), ethylene-propylene elastomer (EPR), poly(4-methyl-1-pentene), and combinations thereof.

Examples of polyamides include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecaamide (nylon 11, polyamide 11, or PA11), polydodecaamide (nylon 12, polyamide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), and the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10, 36, PA 11/6,36, PA 10,10/10,36, PA 6T/6,6, and the like, and any combination thereof. A polyamide followed by a first number comma second number is a polyamide having the first number of backbone carbons between the nitrogens for the section having no pendent =O and the second number of backbone carbons being between the two nitrogens for the section having the pendent =O. By way of nonlimiting example, nylon 6,10 is $[NH-(CH_2)_6-NH-CO-(CH_2)_8-CO]_n$. A polyamide followed by number(s) backslash number(s) are a copolymer of the polyamides indicated by the numbers before and after the backslash.

Examples of polyurethanes include, but are not limited to, polyether polyurethanes, polyester polyurethanes, mixed polyether and polyester polyurethanes, and the like, and any combination thereof. Examples of thermoplastic polyurethanes include, but are not limited to, poly[4,4'-methylenebis (phenylisocyanate)-alt-1,4-butanediol/di(propylene glycol)/ polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

Compatibilizers may optionally be used to improve the blending efficiency and efficacy of the CNM-g-polymer with one or more thermoplastic polymers, such as non-polar polymers. Examples of polymer compatibilizers include, but not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™⁰ (thermoplastic vulcanizate of ethylene-propylene-diene rubber and polypropylene, available from ExxonMobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like and any combination thereof.

The polymer of the CNM-g-polymer 102 and/or the thermoplastic polymer not grafted to a CNM 108 may have a melting point or softening temperature of about 50° C. to about 450° C. (or about 50° C. to about 125° C., or about 100° C. to about 175° C., or about 150° C. to about 280° C., or about 200° C. to about 350° C., or about 300° C. to about 450° C.).

The polymer of the CNM-g-polymer 102 and/or the thermoplastic polymer not grafted to a CNM 108 may have a glass transition temperature (ASTM E1356-08(2014) with 10° C./min ramping and cooling rates) of about −50° C. to about 400° C. (or about −50° C. to about 0° C., or about −25° C. to about 50° C., or about 0° C. to about 150° C., or about 100° C. to about 250° C., or about 150° C. to about 300° C., or about 200° C. to about 400° C.).

The thermoplastic polymer not grafted to a CNM 108 may optionally comprise an additive. Typically, the additive would be present before addition of the thermoplastic polymers to the mixture. Therefore, in the polymer melt droplets and resultant CNM-g-polymer particles 124/130, the additive is dispersed throughout the thermoplastic polymer. Accordingly, for clarity, this additive is referred to herein as an "internal additive." The internal additive may be blended with the thermoplastic polymer just prior to making the mixture or well in advance.

When describing component amounts in the compositions described herein (e.g., the mixture and the CNM-g-polymer particles), a weight percent based on the thermoplastic polymer not inclusive of the internal additive. For example, a composition comprising 1 wt % of emulsion stabilizer by weight of 100 g of a thermoplastic polymer comprising 10 wt % internal additive and 90 wt % thermoplastic polymer is a composition comprising 0.9 g of emulsion stabilizer, 90 g of thermoplastic polymer, and 10 g of internal additive.

The internal additive may be present in the thermoplastic polymer at about 0.1 wt % to about 60 wt % (or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt %) of the thermoplastic polymer not grafted to a CNM 108. For example, the thermoplastic polymer may comprise about 70 wt % to about 85 wt % of a thermoplastic polymer and about 15 wt % to about 30 wt % of an internal additive like glass fiber or carbon fiber.

Examples of internal additives include, but are not limited to, fillers, strengtheners, pigments, pH regulators, and the like, and combinations thereof. Examples of fillers include, but are not limited to, glass fibers, glass particles, mineral fibers, carbon fiber, oxide particles (e.g., titanium dioxide and zirconium dioxide), metal particles (e.g., aluminum powder), and the like, and any combination thereof. Examples of pigments include, but are not limited to, organic pigments, inorganic pigments, carbon black, and the like, and any combination thereof. For example, fillers used herein may include exfoliated graphite (EG), exfoliated graphite nanoplatelets (xGnP), carbon black, carbon nanofibers (CNF), carbon nanotubes (CNT), graphenes, graphene oxides, graphite oxides, graphene oxide nanosheets, fullerenes.

Suitable carrier fluids may have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt). For example, suitable carrier fluids may have a viscosity at 25° C. of about 10,000 cSt to about 60,000 cSt.

Examples of carrier fluids may include, but are not limited to, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. When the carrier fluid comprises two or more of the foregoing, the carrier fluid may have one or more phases. For example, polysiloxanes modified with fatty acids and polysiloxanes modified with fatty alcohols (preferably with similar chain lengths for the fatty acids and fatty alcohols) may form a single-phase carrier fluid. In another example, a carrier fluid comprising a silicone oil and an alkyl-terminal polyethylene glycol may form a two-phase carrier fluid. In at least one embodiment, the carrier fluid is polydimethylsiloxane (PDMS).

The carrier fluid may be present in the mixture at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the CNM-g-polymer 102, the thermoplastic polymers not grafted to a CNM 108, and the carrier fluid 104 combined.

In some instances, the carrier fluid may have a density of about 0.6 g/cm$^3$ to about 1.5 g/cm$^3$, and the thermoplastic polymer may have a density of about 0.7 g/cm$^3$ to about 1.7 g/cm³, wherein the thermoplastic polymer may have a density similar, lower, or higher than the density of the carrier fluid.

The carbon nanomaterial should be sufficiently stable to not decompose at the processing temperatures. Examples of carbon nanomaterial may include, but are not limited to, carbon nanotubes, graphites, graphenes, fullerenes, carbon black; and the like; and any combination thereof.

The emulsion stabilizers used in the methods and compositions of the present disclosure may comprise nanoparticles (e.g. oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 m²/g), AEROSIL® RX50 (about 40 nm average diameter silica nanoparticles having a hydrophobically modified surface and a BET surface area of 35±10 m²/g), AEROSIL® 380 (silica nanoparticles having a hydrophilically modified surface and a BET surface area of 380±30 m²/g), and the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

Surfactants may be anionic, cationic, nonionic, or zwitterionic. Examples of surfactants include, but are not limited to, sodium dodecyl sulfate, sorbitan oleates, poly[dimethylsiloxane-co-[3-(2-(2-hydroxyethoxy)ethoxy)propylmethylsiloxane]], docusate sodium (sodium 1,4-bis(2-ethylhexoxy)-1,4-dioxobutane-2-sulfonate), and the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), and the like, and any combination thereof.

Surfactants may be included in the mixture at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the CNM-g-polymer 102. Alternatively, the mixture may comprise no (or be absent of) surfactant.

A weight ratio of nanoparticles to surfactant in the emulsion stabilizer 106 may be about 1:10 to about 10:1 (or about 1:10 to about 1:1, or about 1:5 to about 5:1, or about 1:1 to about 10:1).

The emulsion stabilizer 106 may be included in the mixture at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the CNM-g-polymer 102 and the thermoplastic polymers not grafted to a CNM 108 combined.

Relative to the combining 110 of FIG. 1, in some instances, the emulsion stabilizer may first be dispersed in the carrier fluid, optionally with heating said dispersion, before adding the CNM-g-polymer 102 and/or the thermoplastic polymers not grafted to a CNM 108. In another nonlimiting example, the CNM-g-polymer 102 and/or the thermoplastic polymers not grafted to a CNM 108 may be heated to produce a polymer melt to which the carrier fluid and emulsion stabilizer are added together or in either order. In yet another nonlimiting example, the CNM-g-polymer 102 and/or the thermoplastic polymers not grafted to a CNM 108 along with carrier fluid can be mixed at a temperature greater than the necessary melting point or softening temperature described herein and at a shear rate sufficient enough to disperse the polymer melt in the carrier fluid. Then, the emulsion stabilizer can be added to form the mixture and maintained at suitable process conditions for a set period of time.

Combining the CNM-g-polymer 102, the thermoplastic polymers not grafted to a CNM 108, the carrier fluid, and optionally the emulsion stabilizer in any combination can occur in a mixing apparatus used for the processing and/or another suitable vessel. By way of nonlimiting example, the CNM-g-polymer 102 and/or the thermoplastic polymers not grafted to a CNM 108 may be heated to a temperature greater than the necessary melting point or softening temperature described herein in the mixing apparatus used for the processing, and the emulsion stabilizer may be dispersed in the carrier fluid in another vessel. Then, said dispersion may be added to the melt in the mixing apparatus used for the processing.

The mixing apparatuses used for the processing to produce the melt emulsion should be capable of maintaining the melt emulsion at a temperature greater than the necessary melting point or softening temperature described herein and applying a shear rate sufficient to disperse the polymer melt in the carrier fluid as droplets.

Examples of mixing apparatuses used for the processing to produce the melt emulsion may include, but are not limited to, extruders (e.g., continuous extruders, batch extruders, and the like), stirred reactors, blenders, reactors with inline homogenizer systems, and the like, and apparatuses derived therefrom.

The processing and forming the melt emulsion at suitable process conditions (e.g., temperature, shear rate, and the like) for a set period of time.

The temperature of the processing and forming the melt emulsion should be a temperature greater than the necessary melting point or softening temperature of the described herein and less than the decomposition temperature of any components (i.e., the CNM-g-polymer 102, the thermoplastic polymers not grafted to a CNM 108, carrier fluid, emulsion stabilizer) in the mixture. For example, the temperature of processing and forming the melt emulsion may be about 1° C. to about 50° C. (or about 1° C. to about 25° C., or about 5° C. to about 30° C., or about 20° C. to about 50° C.) greater than the melting point or softening temperature described herein provided the temperature of processing and forming the melt emulsion is less than the decomposition temperature of any components (i.e., the CNM-g-polymer 102, the thermoplastic polymers not grafted to a CNM 108, carrier fluid, emulsion stabilizer) in the mixture.

The shear rate of processing and forming the melt emulsion should be sufficiently high to disperse the polymer melt in the carrier fluid as droplets. Said droplets should comprise droplets having a diameter of about 1000 µm or less (or about 1 µm to about 1000 µm, or about 1 µm to about 50 µm, or about 10 µm to about 100 µm, or about 10 µm to about 250 µm, or about 50 µm to about 500 µm, or about 250 µm to about 750 µm, or about 500 µm to about 1000 µm).

The time for maintaining said temperature and shear rate for processing and forming the melt emulsion may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached at which point processing can be stopped. That time may depend on, among other things, the temperature, shear rate, the CNM-g-polymer 102, the thermoplastic polymers not grafted to a CNM 108, the carrier fluid composition, and the emulsion stabilizer composition.

The melt emulsion may then be cooled. Cooling can be slow (e.g., allowing the melt emulsion to cool under ambient conditions) to fast (e.g., quenching). For example, the rate of cooling may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling, little to no shear may be applied to the melt emulsion. In some instances, the shear applied during heating may be applied during cooling.

The cooled mixture resulting from cooling the melt emulsion may comprise solidified CNM-g-polymer particles and other components (e.g., the carrier fluid, excess emulsion stabilizer, and the like). The solidified CNM-g-polymer particles may be dispersed in the carrier fluid and/or settled in the carrier fluid.

The cooled mixture may then be treated to the separate CNM-g-polymer particles from the other components. Suitable treatments include, but are not limited to, washing, filtering, centrifuging, decanting, and the like, and any combination thereof.

Solvents used for washing the CNM-g-polymer particles should generally be (a) miscible with the carrier fluid and (b) nonreactive (e.g., non-swelling and non-dissolving) with the CNM-g-polymer 102 and/or the thermoplastic polymers not grafted to a CNM 108. The choice of solvent will depend on, among other things, the compositions of the carrier fluid, the CNM-g-polymer 102, and the thermoplastic polymers not grafted to a CNM 108.

Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, and the like, and any combination thereof.

Solvent may be removed from the CNM-g-polymer particles by drying using an appropriate method such as air-drying, heat-drying, reduced pressure drying, freeze drying, or a hybrid thereof. The heating may be performed preferably at a temperature lower than the glass transition point of the polymer of CNM-g-polymer 102 and the thermoplastic polymers not grafted to a CNM 108, when included, (e.g., about 50° C. to about 150° C.).

Advantageously, carrier fluids and washing solvents of the systems and methods described herein can be recycled and reused. One skilled in the art will recognize any necessary cleaning of used carrier fluid and solvent necessary in the recycling process.

The CNM-g-polymer particles, after separation from the other components, may optionally be further purified. For example, to narrow the particle size distribution (or reduce the diameter span), the CNM-g-polymer particles can be passed through a sieve having a pore size of about 10 µm to about 250 µm (or about 10 µm to about 100 µm, or about 50 µm to about 200 µm, or about 150 µm to about 250 µm).

In another example purification technique, the CNM-g-polymer particles may be washed with water to remove surfactant while maintaining substantially all of the nanoparticles associated with the surface of the CNM-g-polymer particles. In yet another example purification technique, the CNM-g-polymer particles may be blended with additives to achieve a desired final product. For clarity, because such additives are blended with the CNM-g-polymer particles described herein after the particles are solidified, such additives are referred to herein as "external additives." Examples of external additives include flow aids, other polymer particles, fillers, and the like, and any combination thereof.

In some instances, a surfactant used in making the CNM-g-polymer particles may be unwanted in downstream applications. Accordingly, yet another example purification technique may include at least substantial removal of the surfactant from the CNM-g-polymer particles (e.g., by washing and/or pyrolysis).

The CNM-g-polymer particles and/or purified CNM-g-polymer particles may be characterized by composition, physical structure, and the like.

As described above, the emulsion stabilizers are at the interface between the polymer melt and the carrier fluid. As a result, when the mixture is cooled, the emulsion stabilizers remain at, or in the vicinity of, said interface. Therefore, the structure of the CNM-g-polymer particles is, in general when emulsion stabilizers are used, includes emulsion stabilizers (a) dispersed on an outer surface of the CNM-g-polymer particles and/or (b) embedded in an outer portion (e.g., outer 1 vol %) of the CNM-g-polymer particles.

Further, where voids form inside the polymer melt droplets, emulsion stabilizers should generally be at (and/or embedded in) the interface between the interior of the void and the CNM-g-polymer and/or thermoplastic polymer. The voids generally do not contain the CNM-g-polymer and/or thermoplastic polymer. Rather, the voids may contain, for example, carrier fluid, air, or be void. The CNM-g-polymer particles may comprise carrier fluid at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the CNM-g-polymer particles.

When the thermoplastic polymers not grafted to a CNM is not included, the CNM-g-polymer and the thermoplastic polymers not grafted to a CNM, combined, may be present in the CNM-g-polymer particles at about 90 wt % to about 99.5 wt % (or about 90 wt % to about 95 wt %, or about 92 wt % to about 97 wt %, or about 95 wt % to about 99.5 wt %) of the CNM-g-polymer particles. When the thermoplastic polymers not grafted to a CNM is included, the CNM-g-polymer and the thermoplastic polymers not grafted to a CNM, combined, may be present in the CNM-g-polymer particles at about 90 wt % to about 99.5 wt % (or about 90 wt % to about 95 wt %, or about 92 wt % to about 97 wt %, or about 95 wt % to about 99.5 wt %) of the CNM-g-polymer particles. The weight ratio of the CNM-g-polymer to the thermoplastic polymers not grafted to a CNM, when included, may be about 10:90 to about 99:1 (or about 10:90 to about 50:50, or about 25:75 to about 75:25, or about 50:50 to about 99:1, or about 80:20 to about 99:1).

When included, the emulsion stabilizers may be present in the CNM-g-polymer particles at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the CNM-g-polymer particles. When purified to at least substantially remove surfactant or another emulsion stabilizer, the emulsion stabilizers may be present in the CNM-g-polymer particle 124/130 at less than 0.01 wt % (or 0 wt % to about 0.01 wt %, or 0 wt % to 0.001 wt %).

Upon forming thermoplastic particulates according to the disclosure herein using particulate emulsion stabilizers, at least a portion of the particulate emulsion stabilizers, such as silica nanoparticles, may be disposed as a coating upon the outer surface of the CNM-g-polymer particle 124/130. At least a portion of the surfactant, if used, may be associated with the outer surface as well. The coating may be disposed substantially uniformly upon the outer surface. As used herein with respect to a coating, the term "substantially uniform" refers to even coating thickness in surface locations covered by the coating composition (e.g., nanoparticles and/or surfactant), particularly the entirety of the outer surface. The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the CNM-g-polymer particles. When purified to at least substantially remove surfactant or another emulsion stabilizer, the emulsion stabilizers may be present in the CNM-g-polymer particles 124/130 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the CNM-g-polymer particles 124/130. The coverage of the emulsion stabilizers on an outer surface of the CNM-g-polymer particles may be determined using image analysis of the scanning electron microscope images (SEM micrographs). The emulsion stabilizers may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the CNM-g-polymer particles (and coated CNM-g-polymer particles, when produced). When purified to at least substantially remove surfactant or another emulsion stabilizer, the emulsion stabilizers may be present in the CNM-g-polymer particles 124/130 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the CNM-g-polymer particles 124/130. The coverage of the emulsion stabilizers on an outer surface of the CNM-g-polymer particles may be determined using image analysis of the SEM micrographs.

The CNM-g-polymer particles 124/130 of the present disclosure may include the carbon nanomaterial (or cumulative carbon nanomaterials if more than one is used) at about 0.01 wt % to about 50 wt % (or about 0.01 wt % to about 1 wt %, or about 0.1 wt % to about 5 wt %, or about 1 wt % to about 10 wt %, or about 5 wt % to about 20 wt %, or about 10 wt % to about 30 wt %, or about 25 wt % to about 50 wt %) of the CNM-g-polymer particles 124/130.

The CNM-g-polymer particles 124/130 may comprise one or more carbon nanomaterial. For example, two or more different carbon nanomaterials may be grafted to a polymer in the same reaction and then used as CNM-g-polymer in the methods and compositions described herein. In another example, two different CNM-g-polymer s may be produced and blended before (or during) the mixing process of the melt-emulsification process described herein.

The CNM-g-polymer particles 124/130 may have a BET surface area of about 10 m$^2$/g to about 500 m$^2$/g (or about 10 m$^2$/g to about 150 m$^2$/g, or about 25 m$^2$/g to about 100 m$^2$/g, or about 100 m$^2$/g to about 250 m$^2$/g, or about 250 m$^2$/g to about 500 m$^2$/g).

The CNM-g-polymer particles may have a D10 of about 0.1 μm to about 125 μm (or about 0.1 μm to about 5 μm, about 1 μm to about 10 μm, about 5 μm to about 30 μm, or about 1 μm to about 25 μm, or about 25 μm to about 75 μm, or about 50 μm to about 85 μm, or about 75 μm to about 125 μm), a D50 of about 0.5 μm to about 200 μm (or about 0.5 μm to about 10 μm, or about 5 μm to about 50 μm, or about 30 μm to about 100 μm, or about 30 μm to about 70 μm, or about 25 μm to about 50 μm, or about 50 μm to about 100 μm, or about 75 μm to about 150 μm, or about 100 μm to about 200 μm), and a D90 of about 3 μm to about 300 μm (or about 3 μm to about 15 μm, or about 10 μm to about 50 μm, or about 25 μm to about 75 μm, or about 70 μm to about 200 μm, or about 60 μm to about 150 μm, or about 150 μm to about 300 μm), wherein D10<D50<D90. The CNM-g-polymer particles may also have a diameter span of about 0.2 to about 10 (or about 0.2 to about 0.5, or about 0.4 to about 0.8, or about 0.5 to about 1, or about 1 to about 3, or about 2 to about 5, or about 5 to about 10). Without limitation, diameter span values of 1.0 or greater are considered broad, and diameter spans values of 0.75 or less are considered narrow. Preferable, the CNM-g-polymer particles have a diameter span of about 0.2 to about 1.

In a first nonlimiting example, the CNM-g-polymer particles may have a D10 of about 0.1 μm to about 10 μm, a D50 of about 0.5 μm to about 25 μm, and a D90 of about 3 μm to about 50 μm, wherein D10<D50<D90. Said CNM-g-polymer particles may have a diameter span of about 0.2 to about 2.

In a second nonlimiting example, the CNM-g-polymer particles may have a D10 of about 5 μm to about 30 μm, a D50 of about 30 μm to about 70 μm, and a D90 of about 70 μm to about 120 μm, wherein D10<D50<D90. Said CNM-g-polymer particles may have a diameter span of about 1.0 to about 2.5.

In a third nonlimiting example, the CNM-g-polymer particles may have a D10 of about 25 μm to about 60 μm, a D50 of about 60 μm to about 110 μm, and a D90 of about 110 μm to about 175 μm, wherein D10<D50<D90. Said CNM-g-polymer particles may have a diameter span of about 0.6 to about 1.5.

In a fourth nonlimiting example, the CNM-g-polymer particles may have a D10 of about 75 μm to about 125 μm, a D50 of about 100 μm to about 200 μm, and a D90 of about 125 μm to about 300 μm, wherein D10<D50<D90. Said CNM-g-polymer particles may have a diameter span of about 0.2 to about 1.2.

In a fifth nonlimiting example, the CNM-g-polymer particles may have a D10 of about 1 μm to about 50 μm (or about 5 μm to about 30 μm, or about 1 μm to about 25 μm, or about 25 μm to about 50 μm), a D50 of about 25 μm to about 100 μm (or about 30 μm to about 100 μm, or about 30 μm to about 70 μm, or about 25 μm to about 50 μm, or about 50 μm to about 100 μm), and a D90 of about 60 μm to about 300 μm (or about 70 μm to about 200 μm, or about 60 μm to about 150 μm, or about 150 μm to about 300 μm), wherein D10<D50<D90. The CNM-g-polymer particles may also have a diameter span of about 0.4 to about 3 (or about 0.6 to about 2, or about 0.4 to about 1.5, or about 1 to about 3).

The CNM-g-polymer particles may have a circularity of about 0.9 or greater (or about 0.90 to about 1.0, or about 0.93 to about 0.99, or about 0.95 to about 0.99, or about 0.97 to about 0.99, or about 0.98 to 1.0).

The CNM-g-polymer particles may have an angle of repose of about 250 to about 450 (or about 25° to about 35°, or about 300 to about 40°, or about 350 to about 45°).

The CNM-g-polymer particles may have a Hausner ratio of about 1.0 to about 1.5 (or about 1.0 to about 1.2, or about 1.1 to about 1.3, or about 1.2 to about 1.35, or about 1.3 to about 1.5).

The CNM-g-polymer particles may have a bulk density of about 0.3 g/cm$^3$ to about 0.8 g/cm$^3$ (or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

The CNM-g-polymer particles may have an aerated density of about 0.5 g/cm$^3$ to about 0.8 g/cm$^3$ (or about 0.5 g/cm$^3$ to about 0.7 g/cm$^3$, or about 0.55 g/cm$^3$ to about 0.80 g/cm$^3$).

The CNM-g-polymer particles may have a tapped density of about 0.6 g/cm$^3$ to about 0.9 g/cm$^3$ (or about 0.60 g/cm$^3$ to about 0.75 g/cm$^3$, or about 0.65 g/cm$^3$ to about 0.80 g/cm$^3$, or about 0.70 g/cm$^3$ to about 0.90 g/cm$^3$).

Depending on the temperature and shear rate of processing and the composition and relative concentrations of the components (e.g., the CNM-g-polymer, the thermoplastic polymer, the carrier fluid, excess emulsion stabilizer, and the like) different shapes of the structures that compose the CNM-g-polymer particles may be produced. Typically, the CNM-g-polymer particles comprise substantially spherical particles (having a circularity of about 0.97 or greater). However, other structures including disc and elongated structures may be observed in the CNM-g-polymer particles. Therefore, the CNM-g-polymer particles may comprise one or more of: (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The CNM-g-polymer particles may have a sintering window that is within 10° C., preferably within 5° C., of the sintering window of the polymer of the CNM-g-polymer.

Applications of Polymer Particles

The present disclosure also relates to methods of selective laser sintering where the method may comprise: depositing (a) highly spherical polymer particles comprising (a1) CNM-g-polymer and optionally (a2) a thermoplastic polymer that is not the polymer of the CNM-g-polymer and is not grafted to a CNM and optionally (b) other thermoplastic polymer particles not comprising the CNM-g-polymer onto a surface; and once deposited, exposing at least a portion of the spherical polymer particles to a laser to fuse the polymer particles and form a consolidated body.

The CNM-g-polymer particles described herein may be used to produce a variety of articles. By way of nonlimiting example, 3-D printing processes of the present disclosure may comprise: depositing CNM-g-polymer particles described herein upon a surface (e.g., in layers and/or in a specified shape), and once deposited, heating at least a portion of the particles to promote consolidation thereof and form a consolidated body (or object). The consolidated body may have a void percentage of about 5% or less (e.g., 0% to about 5%, or about 0.5% to about 2%, or about 1% to about 3%, or about 2% to about 5%) after being consolidated. For example, heating and consolidation of the polymer particles (e.g., CNM-g-polymer particles 124/130 and other thermoplastic polymer particles) may take place in a 3-D printing apparatus employing a laser, such that heating and consolidation take place by selective laser sintering.

Examples of articles that may be produced by such methods where the CNM-g-polymer particles may be used to form all or a portion of said articles include, but are not limited to, particles, films, packaging, toys, household goods, automotive parts, aerospace/aircraft-related parts, containers (e.g., for food, beverages, cosmetics, personal care compositions, medicine, and the like), shoe soles, furniture parts, decorative home goods, plastic gears, screws, nuts, bolts, cable ties, jewelry, art, sculpture, medical items, prosthetics, orthopedic implants, production of artifacts that aid learning in education, 3D anatomy models to aid in surgeries, robotics, biomedical devices (orthotics), home appliances, dentistry, electronics, sporting goods, and the like. Further, particles may be useful in applications that include, but are not limited to, paints, powder coatings, ink jet materials, electrophotographic toners, 3D printing, and the like.

Example Embodiments

A first nonlimiting example embodiment of the present disclosure is a composition comprising: particles (also referred to herein as CNM-g-polymer particles) comprising a thermoplastic polymer grafted to a carbon nanomaterial (CNM-g-polymer), wherein the particles have an aerated density of about 0.55 g/cm$^3$ to about 0.8 g/cm$^3$.

A second nonlimiting example embodiment of the present disclosure is a composition comprising: particles (also referred to herein as CNM-g-polymer particles) comprising a thermoplastic polymer grafted to a carbon nanomaterial (CNM-g-polymer), wherein the particles have a D50 of about 0.5 μm to about 200 μm and have a circularity of about 0.90 to about 1.0.

A third nonlimiting example embodiment of the present disclosure is a composition comprising: particles (also referred to herein as CNM-g-polymer particles) comprising a thermoplastic polymer grafted to a carbon nanomaterial (CNM-g-polymer), wherein the particles have an angle of repose of about 250 to about 45°.

The first, second, and third nonlimiting example embodiment may further include one or more of: Element 1: wherein the thermoplastic polymer is selected from the group consisting of: a polyamide, a polyurethane, a polyethylene, a polypropylene, a polyacetal, a polycarbonate, polybutylene terephthalate (PBT), polyethylene terephthalate (PET), polyethylene naphthalate (PEN), polytrimethylene terephthalate (PTT), ethylene vinyl acetate copolymer (EVA), ethylene propylene diene rubber (EPDM), ethylene-propylene elastomer (EPR), poly(4-methyl-1-pentene), polyhexamethylene terephthalate, a polystyrene, a polyvinyl chloride, a polytetrafluoroethene, a polyesters (e.g., polylactic acid), a polyether, a polyether sulfone, a polyetherether ketone, a polyacrylate, a polymethacrylate, a polyimide, acrylonitrile butadiene styrene (ABS), polyphenylene sulfide, avinyl polymer, polyarylene ether, polyarylene sulfide, polysulfone, polyether ketone, polyamide-imide, polyetherimide, polyetherester, copolymers comprising a polyether block and a polyamide block (PEBA or polyether block amide), thermoplastic polyolefins (e.g., polymers and copolymers derived from one or more $C_2$ to $C_{40}$ olefin monomers), functionalized or nonfunctionalized ethylene/vinyl monomer polymer, functionalized or nonfunctionalized ethylene/alkyl (meth)acrylate, functionalized or nonfunctionalized (meth)acrylic acid polymer, functionalized or nonfunctionalized ethylene/vinyl monomer/alkyl (meth)acrylate terpolymer, ethylene/vinyl monomer/carbonyl terpolymer, ethylene/alkyl (meth)acrylate/carbonyl terpolymer, methylmethacrylate-butadiene-styrene (MBS)-type core-shell polymer, polystyrene-block-polybutadiene-block-poly(methyl methacrylate) (SBM) block terpolymer, chlorinated or chlorosulphonated polyethylene, polyvinylidene fluoride (PVDF), phenolic resin, poly(ethylene/vinyl acetate), polybutadiene, polyisoprene, styrenic block copolymer, polyacrylonitrile, silicone, and any combination thereof; Element 2: wherein the thermoplastic polymer is selected from the group consisting of: a polyolefin, a polyamide, and a polyurethane (or is selected from the group consisting of: a polyolefin and a polyamide, or is selected from the group consisting of: a polyamide and a polyurethane, or is selected from the group consisting of: a polyolefin and a polyurethane, or is a polyolefin, or is a polyamide, or is a polyurethane); Element 3: wherein the carbon nanomaterial is selected from the group consisting of: a fullerene, a carbon nanotube, graphite, graphene, and any combinations thereof; Element 4: wherein the particles have a circularity of about 0.90 to about 1.0; Element 5: wherein the particles have an angle of repose of about 250 to about 45°; Element 6: wherein the particles have a Hausner ratio of about 1.0 to about 1.5; Element 7: wherein the particles have a D10 of about 0.1 μm to about 125 μm, a D50 of about 0.5 μm to about 200 μm, and a D90 of about 3 μm to about 300 μm, wherein D10<D50<D90; Element 8: wherein the particles have a diameter span of about 0.2 to about 10; Element 9: wherein the particles have an aerated density of about 0.5 g/cm$^3$ (or about 0.6 g/cm$^3$) to about 0.8 g/cm$^3$; Element 10: wherein the particles have a bulk density of about 0.3 g/cm$^3$ to about 0.8 g/cm$^3$; Element 11: wherein the particles have a tapped density of about 0.6 g/cm$^3$ to about 0.9 g/cm$^3$; Element 12: wherein the particles have a BET surface area of about 10 m$^2$/g to about 500 m$^2$/g; Element 13: wherein the particles further comprise an emulsion stabilizer covering at least a portion of a surface of the particles; Element 14: wherein the particles further comprise a nanoparticle emulsion stabilizer embedded in a surface of the particles; Element 15: wherein the CNM-g-polymer is a first CNM-g-polymer, and wherein the particles further comprise a second CNM-g-polymer that is different than the first CNM-g-polymer; Element 16: wherein the particles further comprise a thermoplastic not grafted to a carbon nanomaterial; Element 17: Element 16 and wherein the particles further comprise a compatibilizer; and Element 18: wherein the particles are formed by melt emulsification. Examples of combinations include, but are not limited to, Element 1 or Element 2 in combination with Element 3; Element 1 or Element 2 in combination with Element 3 and in further combination with one or more of Elements 4-12; two or more of Elements 4-12 in combination; one or more of Elements 4-12 in combination with one or more of Elements 13-18 and optionally in further combination with one or more of Elements 1-3; two or more of Elements 13-18 in combination; and one or more of Elements 13-18 in combination with one or more of Elements 1-3.

A fourth nonlimiting example embodiment of the present disclosure is a composition comprising: particles (also referred to herein as CNM-g-polyamide particles) comprising a polyamide grafted to a carbon nanomaterial (CNM-g-polyamide), wherein the particles have an aerated density of about 0.55 g/cm$^3$ to about 0.8 g/cm$^3$. The fourth nonlimiting example embodiment may further include one or more of Elements 3-18.

A fifth nonlimiting example embodiment of the present disclosure is a composition comprising: particles (also referred to herein as CNM-g-polyamide particles) comprising a polyamide grafted to a carbon nanomaterial (CNM-g-polyamide), wherein the particles have a D50 of about 0.5 μm to about 200 μm and have a circularity of about 0.90 to about 1.0. The fifth nonlimiting example embodiment may further include one or more of Elements 3-18.

A sixth nonlimiting example embodiment of the present disclosure is a composition comprising: particles (also referred to herein as CNM-g-polyamide particles) comprising a polyamide grafted to a carbon nanomaterial (CNM-g-polyamide), wherein the particles have an angle of repose of about 25° to about 45°. The sixth nonlimiting example embodiment may further include one or more of Elements 3-18.

A seventh nonlimiting example embodiment of the present disclosure is a composition comprising: particles (also referred to herein as CNM-g-polyurethane particles) comprising a polyurethane grafted to a carbon nanomaterial (CNM-g-polyurethane), wherein the particles have an aerated density of about 0.55 g/cm$^3$ to about 0.8 g/cm$^3$. The seventh nonlimiting example embodiment may further include one or more of Elements 3-18.

An eighth nonlimiting example embodiment of the present disclosure is a composition comprising: particles (also referred to herein as CNM-g-polyurethane particles) comprising a polyurethane grafted to a carbon nanomaterial (CNM-g-polyurethane), wherein the particles have a D50 of about 0.5 µm to about 200 µm and have a circularity of about 0.90 to about 1.0. The eighth nonlimiting example embodiment may further include one or more of Elements 3-18.

A ninth nonlimiting example embodiment of the present disclosure is a composition comprising: particles (also referred to herein as CNM-g-polyurethane particles) comprising a polyurethane grafted to a carbon nanomaterial (CNM-g-polyurethane), wherein the particles have an angle of repose of about 25° to about 45°. The ninth nonlimiting example embodiment may further include one or more of Elements 3-18.

A tenth nonlimiting example embodiment of the present disclosure is a composition comprising: particles (also referred to herein as CNM-g-polyolefin particles) comprising a polyolefin grafted to a carbon nanomaterial (CNM-g-polyolefin), wherein the particles have an aerated density of about 0.55 g/cm$^3$ to about 0.8 g/cm$^3$. The tenth nonlimiting example embodiment may further include one or more of Elements 3-18.

An eleventh nonlimiting example embodiment of the present disclosure is a composition comprising: particles (also referred to herein as CNM-g-polyolefin particles) comprising a polyolefin grafted to a carbon nanomaterial (CNM-g-polyolefin), wherein the particles have a D50 of about 0.5 µm to about 200 µm and have a circularity of about 0.90 to about 1.0. The eleventh nonlimiting example embodiment may further include one or more of Elements 3-18.

A twelfth nonlimiting example embodiment of the present disclosure is a composition comprising: particles (also referred to herein as CNM-g-polyolefin particles) comprising a polyolefin grafted to a carbon nanomaterial (CNM-g-polyolefin), wherein the particles have an angle of repose of about 250 to about 45°. The twelfth nonlimiting example embodiment may further include one or more of Elements 3-18.

CLAUSES

Clause 1. A composition comprising: particles comprising a thermoplastic polymer grafted to a carbon nanomaterial (CNM-g-polymer), wherein the particles have an aerated density of about 0.55 g/cm$^3$ to about 0.8 g/cm$^3$.

Clause 2. A composition comprising: particles (also referred to herein as CNM-g-polymer particles) comprising a thermoplastic polymer grafted to a carbon nanomaterial (CNM-g-polymer), wherein the particles have a D50 of about 0.5 µm to about 200 µm and have a circularity of about 0.90 to about 1.0.

Clause 3. A composition comprising: particles (also referred to herein as CNM-g-polymer particles) comprising a thermoplastic polymer grafted to a carbon nanomaterial (CNM-g-polymer), wherein the particles have an angle of repose of about 25° to about 45°.

Clause 4. The composition of Clause 1 or Clause 2 or Clause 3, wherein the thermoplastic polymer is selected from the group consisting of: a polyolefin, a polyamide, and a polyurethane (or is selected from the group consisting of: a polyolefin and a polyamide, or is selected from the group consisting of: a polyamide and a polyurethane, or is selected from the group consisting of: a polyolefin and a polyurethane, or is a polyolefin, or is a polyamide, or is a polyurethane).

Clause 5. The composition of Clause 1 or Clause 2 or Clause 3, wherein the carbon nanomaterial is selected from the group consisting of: a fullerene, a carbon nanotube, graphite, graphene, and any combinations thereof.

Clause 6. The composition of Clause 1 or Clause 2 or Clause 3, wherein the particles have a circularity of about 0.90 to about 1.0.

Clause 7. The composition of Clause 1 or Clause 2 or Clause 3, wherein the particles have an angle of repose of about 250 to about 45°.

Clause 8. The composition of Clause 1 or Clause 2 or Clause 3, wherein the particles have a Hausner ratio of about 1.0 to about 1.5.

Clause 9. The composition of Clause 1 or Clause 2 or Clause 3, wherein the particles have a D10 of about 0.1 µm to about 125 µm, a D50 of about 0.5 µm to about 200 µm, and a D90 of about 3 µm to about 300 µm, wherein D10<D50<D90.

Clause 10. The composition of Clause 1 or Clause 2 or Clause 3, wherein the particles have a diameter span of about 0.2 to about 10.

Clause 11. The composition of Clause 1 or Clause 2 or Clause 3, wherein the particles have an aerated density of about 0.5 g/cm$^3$ (or about 0.6 g/cm$^3$) to about 0.8 g/cm$^3$.

Clause 12. The composition of Clause 1 or Clause 2 or Clause 3, wherein the particles have a bulk density of about 0.3 g/cm$^3$ to about 0.8 g/cm$^3$.

Clause 13. The composition of Clause 1 or Clause 2 or Clause 3, wherein the particles have a tapped density of about 0.6 g/cm$^3$ to about 0.9 g/cm$^3$.

Clause 14. The composition of Clause 1 or Clause 2 or Clause 3, wherein the particles have a BET surface area of about 10 m$^2$/g to about 500 m$^2$/g.

Clause 15. The composition of Clause 1 or Clause 2 or Clause 3, wherein the particles further comprise an emulsion stabilizer covering at least a portion of a surface of the particles.

Clause 16. The composition of Clause 1 or Clause 2 or Clause 3, wherein the particles further comprise a nanoparticle emulsion stabilizer embedded in a surface of the particles.

Clause 17. The composition of Clause 1 or Clause 2 or Clause 3, wherein the CNM-g-polymer is a first CNM-g-polymer, and wherein the particles further comprise a second CNM-g-polymer that is different than the first CNM-g-polymer.

Clause 18. The composition of Clause 1 or Clause 2 or Clause 3, wherein the particles further comprise a thermoplastic not grafted to a carbon nanomaterial.

Clause 19. The composition of Clause 18, wherein the particles further comprise a compatibilizer.

Clause 20. The composition of Clause 1 or Clause 2 or Clause 3, wherein the thermoplastic polymer is selected from the group consisting of: a polyamide, a polyurethane, a polyethylene, a polypropylene, a polyacetal, a polycarbonate, polybutylene terephthalate (PBT), polyethylene terephthalate (PET), polyethylene naphthalate (PEN), polytrimethylene terephthalate (PTT), ethylene vinyl acetate copolymer (EVA), ethylene propylene diene rubber (EPDM), ethylene-propylene elastomer (EPR), poly(4-methyl-1-pentene), polyhexamethylene terephthalate, a polystyrene, a polyvinyl chloride, a polytetrafluoroethene, a polyesters (e.g., polylactic acid), a polyether, a polyether sulfone, a polyetherether ketone, a polyacrylate, a polymethacrylate, a polyimide, acrylonitrile butadiene styrene (ABS), polyphenylene sulfide, avinyl polymer, polyarylene ether, polyarylene sulfide, polysulfone, polyether ketone, polyamide-imide, polyetherimide, polyetherester, copolymers comprising a polyether block and a polyamide block (PEBA or polyether block amide), thermoplastic polyolefins (e.g., polymers and copolymers derived from one or more $C_2$ to $C_{40}$ olefin monomers), functionalized or nonfunctionalized ethylene/vinyl monomer polymer, functionalized or nonfunctionalized ethylene/alkyl (meth)acrylate, functionalized or nonfunctionalized (meth)acrylic acid polymer, functionalized or nonfunctionalized ethylene/vinyl monomer/alkyl (meth)acrylate terpolymer, ethylene/vinyl monomer/carbonyl terpolymer, ethylene/alkyl (meth)acrylate/carbonyl terpolymer, methyl-methacrylate-butadiene-styrene (MBS)-type core-shell polymer, polystyrene-block-polybutadiene-block-poly (methyl methacrylate) (SBM) block terpolymer, chlorinated or chlorosulphonated polyethylene, polyvinylidene fluoride (PVDF), phenolic resin, poly(ethylene/vinyl acetate), polybutadiene, polyisoprene, styrenic block copolymer, polyacrylonitrile, silicone, and any combination thereof.

Clause 21. The composition of Clause 1 or Clause 2 or Clause 3, wherein the particles are formed by melt emulsification.

Clause 22. A composition comprising: particles comprising a polyamide grafted to a carbon nanomaterial (CNM-g-polyamide), wherein the particles have an aerated density of about 0.55 g/cm$^3$ to about 0.8 g/cm$^3$.

Clause 23. A composition comprising: particles (also referred to herein as CNM-g-polyamide particles) comprising a polyamide grafted to a carbon nanomaterial (CNM-g-polyamide), wherein the particles have a D50 of about 0.5 μm to about 200 μm and have a circularity of about 0.90 to about 1.0.

Clause 24. A composition comprising: particles (also referred to herein as CNM-g-polyamide particles) comprising a polyamide grafted to a carbon nanomaterial (CNM-g-polyamide), wherein the particles have an angle of repose of about 250 to about 45°.

Clause 25. A composition comprising: particles comprising a polyurethane grafted to a carbon nanomaterial (CNM-g-polyurethane), wherein the particles have an aerated density of about 0.55 g/cm$^3$ to about 0.8 g/cm$^3$.

Clause 26. A composition comprising: particles (also referred to herein as CNM-g-polyurethane particles) comprising a polyurethane grafted to a carbon nanomaterial (CNM-g-polyurethane), wherein the particles have a D50 of about 0.5 μm to about 200 μm and have a circularity of about 0.90 to about 1.0.

Clause 27. A composition comprising: particles (also referred to herein as CNM-g-polyurethane particles) comprising a polyurethane grafted to a carbon nanomaterial (CNM-g-polyurethane), wherein the particles have an angle of repose of about 25° to about 45°.

Clause 28. A composition comprising: particles comprising a polyolefin grafted to a carbon nanomaterial (CNM-g-polyolefin), wherein the particles have an aerated density of about 0.55 g/cm$^3$ to about 0.8 g/cm$^3$.

Clause 29. A composition comprising: particles (also referred to herein as CNM-g-polyolefin particles) comprising a polyolefin grafted to a carbon nanomaterial (CNM-g-polyolefin), wherein the particles have a D50 of about 0.5 μm to about 200 μm and have a circularity of about 0.90 to about 1.0.

Clause 30. A composition comprising: particles (also referred to herein as CNM-g-polyolefin particles) comprising a polyolefin grafted to a carbon nanomaterial (CNM-g-polyolefin), wherein the particles have an angle of repose of about 25° to about 45°.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example A1. Unfilled polyolefin powder: Unfilled polyolefin powder was prepared by melt extrusion in the following manner. The extruder was brought to a temperature around the melting point of the polymer and the rotors were started at a slow speed. Polymer pellets were added to the heated extruder followed by the carrier fluid. PDMS oil was used as carrier fluid, with a viscosity ranging from 10,000 cSt to 60,000 cSt at room temperature. The ratio of PDMS oil to polymer was 70:30 (or 30% polymer pellets in 70% PDMS oil). An optional dispersing agent or flow aid may be added prior to the carrier fluid to aid with the flow of the dried particles. The extruder was operated at 200 rpm (maximum speed) for 30 minutes, at 225° C. The mixture was then discharged onto a metal tray with dry ice to provide rapid quench cooling. Once the dry ice had sublimated, the PDMS oil was washed away from the microparticles with three heptane washes, and the microparticles were isolated by vacuum filtration. The microparticles were then dried overnight in a vacuum oven at room temperature to allow any residual heptane to evaporate. The dried particles were then sieved through a 150 m or 250 m screen. The resulting sieved powder was obtained with a final average particle size (D50) of approximately 50 microns and a span of approximately 1.

Example A2 (Prophetic). Polyolefin powder melt mixed with CNT filler. CNM-g-polyolefin may be prepared by melt processing (e.g., melt extrusion). The extruder may be brought to a temperature around the melting point of the polymer and the rotors may be started. At a low speed, polyolefin resin pellets may be fed into the chamber. CNT may then be added to melt compound into the resin. PDMS oil may be used as carrier fluid, with a viscosity ranging from 10,000 cSt to 60,000 cSt at room temperature. The ratio of PDMS oil to polymer may be 70:30. At temperature, the extruder may be operated at 200 rpm (maximum speed) for 30 minutes at 225° C. The mixture may then be discharged onto a metal tray with dry ice to provide rapid quench cooling. Once the dry ice has sublimated, the oil may be washed away from the microparticles with three heptane washes and the microparticles may be isolated by vacuum filtration. The microparticles may then be dried overnight in a vacuum oven at room temperature to allow any residual heptane to evaporate. The dried particles may then be sieved through a 150 m or 250 m screen.

Example A3 (Prophetic). Polymerization of Polyolefin onto CNT: Pretreatment of Carbon Nanotubes with the Cocatalyst: The crude nanotubes may be placed into a polymerization flask and flame-dried under high vacuum. The flask may then be filled with nitrogen, and may be placed in an oil bath at 50° C. Then, dried and deoxygenated n-heptane and MAO may be added under nitrogen. The CNTs, in contact with the aluminoxane, may be stirred for 1 hour at 50° C. Solvents may then be distilled off at 50° C. under reduced pressure. The solvents, together with any volatile organoaluminum compounds, may be trapped in a flask cooled by liquid nitrogen for aluminum titration. Treated CNTs may further be heated up at 150° C. under reduced pressure for 90 minutes to bind the MAO to the carbon nanotubes, thus producing the aluminoxane-treated CNTs.

Polymerization of Polyolefin onto CNT: Homopolymerization of Ethylene (or Propylene) in the Presence of Carbon Nanotubes Pretreated with the Cocatalyst: The aluminoxane-treated CNTs may be dispersed in dried n-heptane. Then, $Cp*_2ZrCl_2$ may be added to the suspension. The stirred mixture may then be heated up to 50° C. for 15 minutes. The reactor may be purged by ethylene (0.5 minute) in order to remove nitrogen. The polymerization reaction may be carried out under a constant pressure of 13 bar of ethylene at 50° C. and vigorous stirring for a defined period of time. The final material may be precipitated in methanol acidified with 12 M hydrochloric acid and filtered off. This step may allowed for both recovering the HDPE coated nanotubes and deactivating the catalytic complex yielding residual aluminum oxide ($Al_2O_3$) in all samples. The resulting material may be dried at 60° C. for approximately 12 hours in a ventilated oven.

Preparation of CNT-Polyolefin Microparticles-Melt Extrusion: Microparticles may be produced from the CNM-g-polyolefin Sample 1 by melt extrusion in a HAAKE™ RHEOMIX twin screw extruder with high shear rotors. The extruder may be brought to a temperature around the melting point of the polymer and the rotors may be started at a slow speed. The polymer pellets of Sample 1 may be added to the heated extruder followed by the carrier fluid. PDMS oil may be used as carrier fluid, with a viscosity ranging from 10,000 cSt to 60,000 cSt at room temperature. The ratio of PDMS oil to polymer may be 70:30. An optional dispersing agent or flow aid may be added prior to the carrier fluid to aid with the flow of the dried particles. At temperature, the extruder may be operated at 200 rpm (maximum speed) for 30 minutes. The mixture may then be discharged onto a metal tray with dry ice to provide rapid quench cooling. Once the dry ice has sublimated, the oil may be washed away from the microparticles with three heptane washes and the microparticles may be isolated by vacuum filtration. The microparticles may be dried overnight in a vacuum oven at room temperature to allow any residual heptane to evaporate. The dried particles may then be sieved through a 150 m or 250 m screen.

SLS Printing and Mechanical Testing: The baseline performance of the dried powders may be determined by sintering the samples. The samples may be 3D printed on a SNOWWHITE SLS printer (available from Sharebot). The laser may selectively fuse the sample by scanning cross-sections of the desired object generated using a computer-aided design (CAD) model. After the first layer comprising the sample is scanned, the powder bed may be lowered, and another portion of the sample may be rolled on top, and the subsequent layer may be scanned until the part is completed. Advantageously, when compared to current additive manufacturing techniques, the use of such powder-based system may enable the elimination of printing supports and the ability to reuse the materials.

The mechanical properties of Example A1, Example A2, and Example A3 may be determined by printing ASTM Tensile D638, Type V Dogbone bars on the SNOWWHITE SLS printer. It is expected that the mechanical properties of CNM-g-polyolefin may be greater than the mechanical properties of unfilled polyolefin. Further, the polyolefins grafted with CNTs may have superior mechanical properties to polyolefins which are simply melt mixed with CNTs (i.e., not grafted). Without being bond by any theory or mechanism, it is believed that SLS printing would not change the intrinsic mechanical properties of the materials, hence the CNM-g-polyolefin particle should yield SLS printed objects with improved mechanical properties over polyolefin microparticles not compounded with CNTs or microparticles of mixed (not grafted) polyolefin and CNTs.

Example A4 (Prophetic). Metallocene Catalysis via Polymerization Filling Technique (PFT): Pretreatment of the Carbon Nanotubes with the Cocatalyst. Twenty-six grams of multi-walled carbon nanotubes (MWNTs) may be dried overnight at 100° C. under vacuum and may be added under nitrogen to 2.6 L of dried and deoxygenated n-heptane and 221 mL of MAO (deprived of its trimethylaluminum (TMA) by distillation). The TMA may be recovered, and may be kept for titration (fraction 1). The system may then be stirred for 1 hour at 40° C. Solvents may be distilled off at 40° C. under reduced pressure. The solvents together with any volatile organoaluminum compounds may be trapped in a flask cooled down by liquid nitrogen (fraction 2). Treated CNTs may be heated to 150° C. under reduced pressure for 90 minutes. The MAO excess may be removed by washing thrice with dried toluene (3×70 ml) at 60° C. (fraction 3). Fractions 1, 2 and 3 may be hydrolyzed by addition of 150 ml aqueous HCl (ca. 2 M) and extracted. Aluminum may be back-titrated by EDTA, for assessing the amount of MAO fixed on the CNTs. Aluminum concentration may then be evaluated by titration with EDTA as the mean of three aliquots. The organics solvents may be evaporated by heating the solution to ebullition under magnetic agitation. 5 ml of the acidic solution may be diluted 20-fold, and then 20 ml of a solution of 0.025 M EDTA may be added. The solution may be heated to ebullition, and may then be cooled to room temperature. The solution may be buffered at pH=4.76 with sodium acetate. The excess of EDTA may be determined by titration with a solution of $ZnSO_4$ (0.05 M) with xylenol orange as indicator. The as—determined concentration of the aluminum complex may be used to calculate the amount of aluminum that may be evacuated during the solvent evaporation and the CNTs washing process.

Homopolymerization of Ethylene in the Presence of Carbon Nanotubes Pretreated with the Cocatalyst: The treated CNTs (approximately 26 g) may be dispersed in 2.6 L dried n-heptane and may then be transferred into 250 ml glass-reactor in a glove-box. Then, 57.2 ml of $Cp_2*ZrCl_2$ (molar concentration of 5.2 $10^{-3}$ M) may be added to the suspension. The stirred mixture may be heated up to 50° C. for 15 minutes. The reactor may be purged by ethylene (0.5 min) in order to remove nitrogen. The synthesis may be carried out under a constant pressure of 2.7 bars of ethylene at 50° C. and vigorous stirring for 1 hour. The final material may be precipitated in 15.6 L methanol acidified with hydrochloric acid, and may be dried at 70° C. for about 7 hours under reduced pressure.

Preparation of Carbon Nanotube-Polyethylene (CNT-PE) Microparticles: The microparticles may be produced from the CNM-g-polyolefin prepared above by melt extrusion in a HAAKE™ RHEOMIX twin screw extruder with high shear rotors. The extruder may be brought to a temperature around the melting point of the polymer (225° C.) and the rotors may be started at 120 rpm. 65 g of the MWNT-g-PE polymer (prepared above) may be added to the heated extruder followed by 152 g carrier fluid. The carrier fluid may be polydimethylsiloxane (PDMS) oil having a viscosity ranging from 10,000 cSt to 60,000 cSt at room temperature. The ratio of PDMS oil to polymer may be 70:30 (or 30% polymer solids in 70% oil). Using approximately 20 g of the measured PDMS, a slurry may be made by mixing the PDMS with 0.325 g RX50 (0.5 wt % of MWNT-g-PE polymer) fumed silica. The resulting slurry may then be added into the extruder. At temperature, the extruder may be operated at 120 rpm for 10 minutes. The mixture may then be discharged onto a metal tray with dry ice to provide rapid quench cooling. Once the dry ice is sublimated, the oil may be washed away from the microparticles with three heptane washes and the microparticles may be isolated by vacuum filtration. The microparticles may then be dried overnight in a vacuum oven at room temperature to allow any residual heptane to evaporate. The dried particles may be sieved through a 150 m or 250 m screen. The resulting powder may have a final average particle size (D50) of approximately 50 microns and a span of approximately 1.

Example A5 (Prophetic). Synthesis of graphene oxide-supported Ziegler-Natta catalyst: A Grignard reagent, $C_4H_9MgCl$ (BuMgCl) may be prepared by reacting chlorobutane (10 mL) and magnesium powder (14.2 g) in tetrahydrofuran (250 mL) at refluxing temperature (80° C.) under $N_2$ atmosphere for 20 hours. Then, 0.1 mol of BuMgCl/tetrahydrofuran solution may be added dropwise into 4 L of tetrahydrofuran suspension containing 4.06 g graphene oxide (GO). After 48 hours of reaction at refluxing temperature (80° C.), the excess Grignard reagent may be filtered off, and the solid may be washed in turn with tetrahydrofuran and hexane three times. The powdery product may then be dried under vacuum at 60° C. for 12 hours, which may result in 6.08 g BuMgCl/GO. Five grams of BuMgCl/GO may then be added into 250 mL titanium tetrachloride ($TiCl_4$) at room temperature, after which the temperature may be brought up to 120° C., and the mixture may be stirred for 4 hours. Then the reactant may be filtered to remove the unreacted $TiCl_4$ and a second 150 mL volume of $TiCl_4$ may be charged into the reactor. The reaction may be completed after stirring for 4 hours at 120° C. The reaction mixture may then be filtered, washed with hot hexane (e.g., washed six times), and dried under vacuum at 60° C. for 12 hours, to produce about 4.57 g GO-supported Ziegler-Natta catalyst, $TiCl_4$/(BuMgCl/GO).

In-situ Polypropylene Polymerization: The polymerization reaction may be carried out with a PARR stainless steel autoclave reactor equipped with a mechanical stirrer. 500 mL of hexane may be added into the reactor, which may then be filled with propylene under a constant pressure of 0.5 MPa. The reactor may be heated at 60° C., and the powdery catalyst $TiCl_4$/(BuMgCl/GO) (0.193 g) may be added into the vigorously stirred liquid mixture saturated with propylene. The polymerization reaction may be initiated by charging $AlEt_3$ (3.04 mL, 1.08 mmol) and dimethyoxydiphenylsilane (0.108 mmol) into the reactor using syringe. After 30 min, the polymerization may be quenched by 105 mL of acidified ethanol (containing 10% HCl). The polymer product may be collected by filtration, and repeatedly washed with ethanol and distilled water. After it is dried under vacuum at 60° C. for 24 hours, 65 g of polymer product may be obtained as a gray powder (polypropylene/graphene oxide (PP/GO)).

Preparation of Polypropylene-Graphene Oxide Microparticles: Microparticles may be produced from the PP-g-GO prepared above by melt extrusion in a HAAKE™ RHEOMIX twin screw extruder with high shear rotors. The extruder may be brought to a temperature around the melting point of the polymer (225° C.) and the rotors may be started at 120 rpm. 65 g of the PP-g-GO (prepared above) may be added to the heated extruder followed by 152 g carrier fluid. The carrier fluid may be polydimethylsiloxane (PDMS) oil having a viscosity ranging from 10,000 cSt to 60,000 cSt at room temperature. The ratio of PDMS oil to polymer may be 70:30 (or 30% polymer solids in 70% oil). Using approximately 20 g of the measured PDMS, a slurry may be made by mixing the PDMS with 0.325 g AEROSIL® RX50 (0.5 wt % of PP-g-GO) fumed silica. The resulting slurry may then be added into the extruder. At temperature, the extruder may be operated at 120 rpm for 10 minutes. The mixture may then be discharged onto a metal tray with dry ice to provide rapid quench cooling. Once the dry ice has sublimated, the oil may be washed away from the microparticles with three heptane washes and the microparticles may then be isolated by vacuum filtration. The microparticles may then be dried overnight in a vacuum oven at room temperature to allow any residual heptane to evaporate. The dried particles may be sieved through a 150 m or 250 m screen. The resulting powder may have a final average particle size (D50) of approximately 50 microns and a span of approximately 1.

Example A6. As series of melt emulsification methods described herein were performed using commercially available polypropylene as the thermoplastic polymer (not grafted to a CNM). The properties of the produced polypropylene particles include: a D50 of about 41 μm to about 43 μm, a span of about 1.3 to about 1.4, and an angle of repose of about 40.2° to about 41.0°. By comparison, commercially available polyurethane particles produced by cryomilling methods have properties measured in-house by the same methods at the foregoing particles that include: a D50 of about 62 μm to about 68 μm, a span of about 1.1, and an angle of repose of about 45.3° to about 50.3°.

Figure 2:
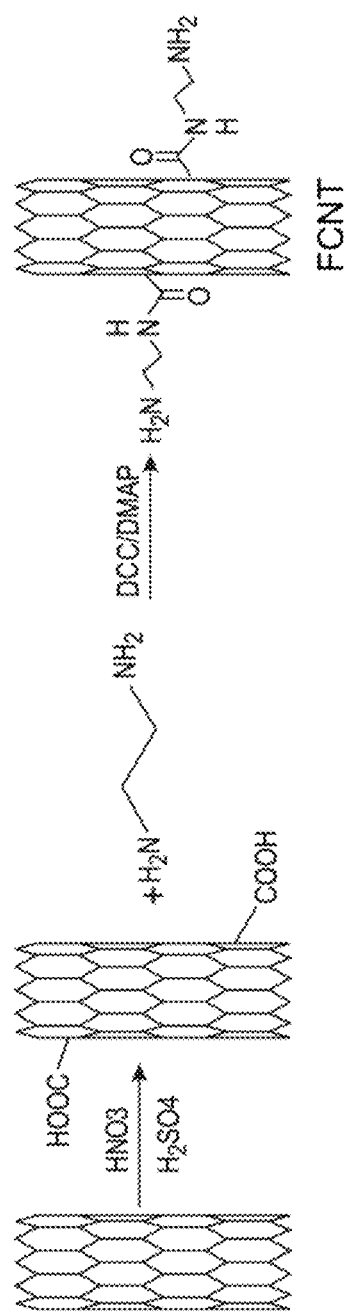
FIG. 2 shows Scheme 1.

Example B1a (Prophetic). Preparation of amino-functionalized carbon nanotubes for polyamide synthesis is described. FIG. 2 shows Scheme 1, which illustrates a nonlimiting synthetic route example of amino-functionalized CNTs via acidification. A CNT, such as a multiwalled carbon nanotube (MWCNT), may be first oxidized via a mixture of concentrated sulfuric acid with nitric acid at a volume ratio of 3:1. The acidification may take place by sonication of the CNT in the acid solution at 50° C. for 3 hours in an ultrasonic bath. The resulting CNT/acid mixture may then be poured into deionized water, filtered and washed repeatedly until the pH value of the filtration solution is about 7 (neutral pH). The acidified CNT product (CNT-COOH) may then be dried in a vacuum oven at 80° C. for 6 hours. About 1 g of CNT-COOH may be dispersed in 2 L of THF under sonication for at least 1 hour. To this dispersion, while stirring at ambient temperature, may be added 20 g (340 mmol) ethylenediamine (EDA), 1 g (10 mmol) 4-(dimethylamino) pyridine (DMAP), and 10 g (50 mmol) N,N'-dicyclohexylcarbodiimide (DCC). The dispersion/solution may be heated to 60° C. and may be held at this temperature for 24 hours with stirring. The product may be a black solid which may be easily collected and washed three times with THF (1 L to 1.5 L per wash). The product may be dried in a vacuum oven to obtain the amino-functionalized CNT. Further functionalization (e.g., amino group) may enable improved reactivity of the CNT with the polyamide monomers. The direct CNT-COOH route may be used directly to prepare the polyamide/CNT, although lower reactivity may be observed due to the reduced mobility due to the COOH directly attached to the surface of the CNT and not extended out like the amino group. polyamide/CNT, although lower reactivity may be observed due to the reduced mobility due to the COOH directly attached to the surface of the CNT and not extended out like the amino group.

Figure 3:
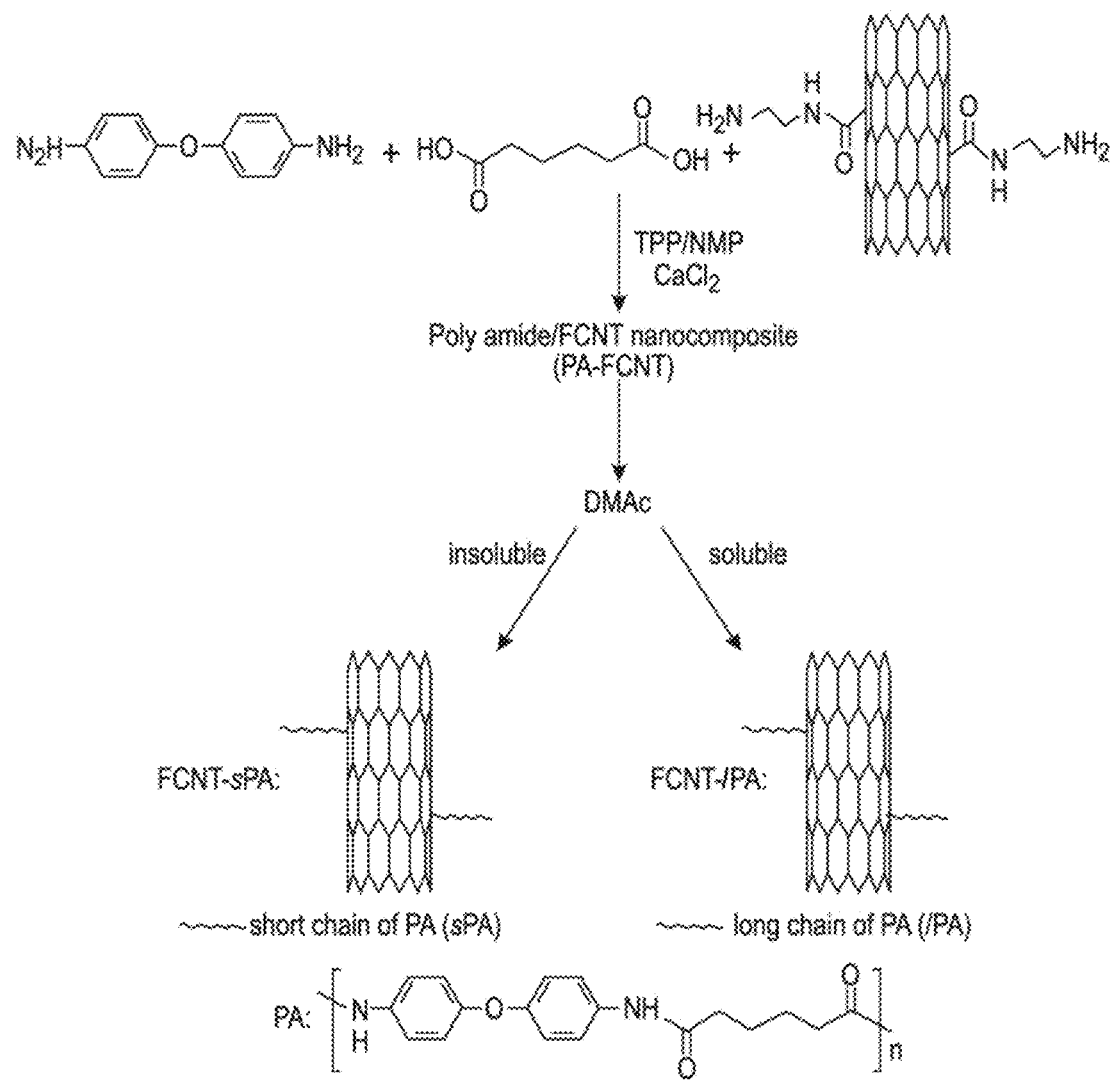
FIG. 3 shows Scheme 2.

Example B1b (Prophetic). Preparation of the polyamide/amino functionalized CNT (PA/CNT) nanocomposite via in situ polycondensation is described. FIG. 3 shows Scheme 2, which illustrates a nonlimiting example of the synthesis of a polyamide with amino-functionalized CNT (FCNT) resulting in insoluble short chain PA/FCNT and soluble long chain PA/FCNT. A 2 wt % PA/CNT nanocomposite may be prepared by dispersing 0.497 g of the amino-FCNT (e.g., from Example B1a) in N-methyl-2-pyrrolidone (NMP) (60 ml) while sonicating for 30 minutes. The final mixture may be a homogeneous solution of the amino-FCNT. The resulting mixture may be transferred to a 1 L three-necked flask equipped with a magnetic stirrer or overhead stirrer. To the said flask, may be added 10 g adipic acid (68 mmol), 17 g 4,4-diaminodiphenyl sulphone (68 mmol), 3 g calcium chloride (18 mmol), 42.4 ml triphenyl phosphite (137 mmol), and pyridine (7 ml). The reaction may be carried out at 60° C. for 1 hour, at 90° C. for 2 hours, and 120° C. for 8 hours, respectively, which may result in a viscous mixture. The viscous mixture may be precipitated in 500 ml methanol to obtain the PA/CNT. The precipitate can be collected by filtration and washed thoroughly with hot methanol at a temperature ranging from about 45° C. to about 50° C.).

If required, the short and long polymeric grafted CNTs may be separated by solvent solubility differences (Scheme 2). The grafted PA/CNTs may be dispersed in 250 ml of N,N-dimethylacetamide (DMAc), and may be stirred for 1 hour at 65° C. The material with shorter polymer CNT chains may be filtered onto filter paper to recover the solid product and may be dried for about 12 hours at 95° C. in a vacuum oven. The DMAc solution, which may be dark in color, may be poured into 500 ml water to encourage precipitation of the long chained polymeric CNT product. The long chained polymeric CNT product may be collected by filtration, washed thoroughly several times with methanol, and dried in a vacuum oven at 95° C. for 12 hours.

Figure 4:
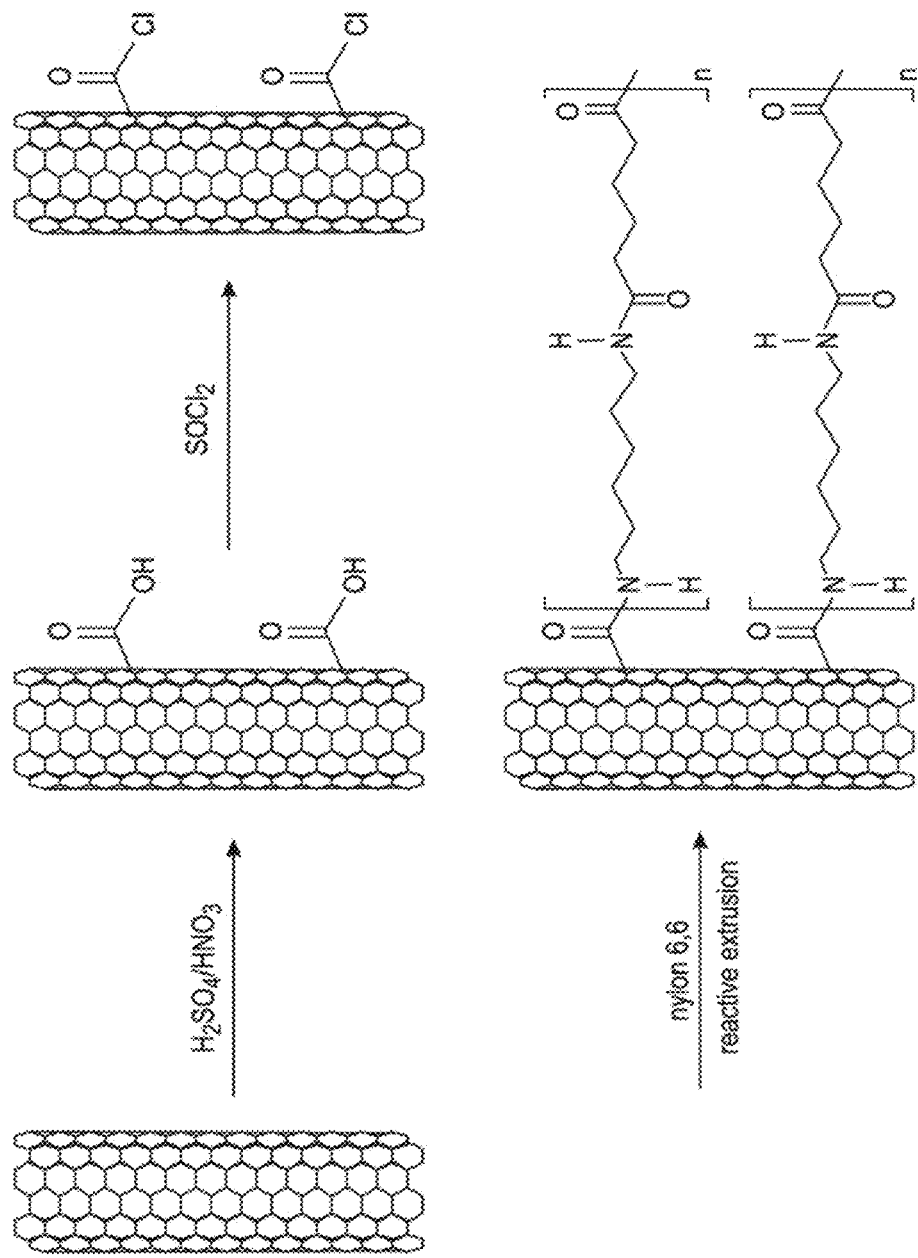
FIG. 4 shows Scheme 3.

Example B2 (Prophetic). Preparation of polyhexamethylene adipamide-MWCNT graft composites (polyamide 6,6-MWCNT graft composites) via reactive extrusion for fabrication of SLS powders by melt emulsification is described. FIG. 4 shows Scheme 3, which illustrates a nonlimiting example of a reactive extrusion approach which may be used as a synthetic route for preparation of polyamide 6,6 grafted MWCNT, where the COCl grafted MWCNTs may react with the amine end-groups of PA6,6. As discussed above, pristine MWCNTs may be functionalized with $H_2SO_4$/$HNO_3$ where 1 gram of MWCNTs may be mixed with the $H_2SO_4$ (conc. 98 vol. %) and $HNO_3$ (conc. 70 vol. %) at a ratio of $H_2SO_4$:$HNO_3$ of 3/2 by volume (2000 ml total). The mixture may be heated to 60° C. while refluxing for 24 hours. Then, the mixture may be diluted with about 1 L deionized water (DIW), and may be filtered through a 450 nm nylon membrane. The MWCNTs may be further washed with DIW (5×200 ml), and then dried in a vacuum oven for 24 hours at ambient temperature. The resulting COOH functionalized MWCNTs (MWCNT-COOH) may be dispersed in thionyl chloride ($SOCl_2$) (500 ml) in a sonicator for 2 hours, and may further be stirred for another 24 hours at 70° C. Further, the mixture may be vacuum-filtered through a 450 nm nylon membrane, and washed with tetrahydrofuran (3×200 ml) and ethanol (3×200 ml). The resulting MWCNT-COCl may be dried for 12 hours in a vacuum oven at ambient temperature.

Reactive extrusion may be used to prepare the polyamide 6,6-MWCNTs (50 g PA6,6 with 2 wt % MWCNT-COCl), where a twin extruder with 4 different zones may be used for feeding (265° C.), melting (280° C.), mixing (280° C.), and exit (260° C.). The material feed rate and extrusion speed may be held constant at 10 g/min and 300 rpm, respectively. As extruded, the melt-mixed composites may be quenched in a water bath. The composite may be dissolved in formic acid (about 3 L for 50 g composite) to remove unreacted PA6,6 from the PA6,6-MWCNT via centrifugation at about 4000 xg to about 10,000 xg, for about 10 minutes or more (or about 20 minutes or more, or about 30 minutes or more), at 4° C. The collected PA6,6-MWCNT may be redispersed in formic acid again (3 L) and collected again via centrifugation to further remove unreacted PA6,6. This procedure may be repeated 5 times or more and the resulting product may be washed with formic acid (3 L×3), and may be dried for 12 hours in a vacuum oven at 30° C. The resulting PA6,6-MWCNT may be confirmed by Fourier-transform infrared spectroscopy (FT-IR), X-ray photoelectron spectroscopy (XPS), field emission scanning electron microscopy (FE-SEM), and thermogravimetric analysis (TGA). The tensile modulus and yield strengths of the composites is expected to be higher than the PA6,6 alone or the melt mixed version of the PA6,6 with pristine MWCNT, thus due to the strong interfacial adhesion and reinforcement via hydrogen bonding and chain entanglement between the PA6,6 matrix and PA6,6 grafted on the MWCNTs. The resulting composite may be converted into its corresponding spherical particles for use in a selective laser sintering (SLS) 3D printer.

Example B3 (Prophetic). Preparation of PA-CNT microparticles by melt emulsification is described. Microparticles may be produced from the polyamide-CNT nanocomposite prepared in Example B1b and Example B2 by melt extrusion in a HAAKE™ RHEOMIX twin screw extruder with high shear rotors. The extruder may be brought to a temperature around the melting point of the polymer and the rotors may be started at a slow speed (ranging from 50 rpm to 100 rpm, then up to 250 rpm). The PA-CNT polymer pellets from either of the above examples may be added to the heated extruder followed by the carrier fluid. The carrier fluid may be PDMS oil having a viscosity of 10,000 cSt to 60,000 cSt at room temperature. The ratio of PDMS oil to polymer may be 70:30 or 30% polymer solids in 70% oil. An optional dispersing agent or flow aid may be added prior to the carrier fluid to aid with the flow of the dried particles. The extruder may be operated at 200 rpm (maximum speed) for 30 minutes. The mixture may be discharged onto a metal tray with dry ice to provide rapid quench cooling. Once the dry ice has sublimated, the oil may be washed away from the microparticles with three heptane washes and the microparticles may be isolated by vacuum filtration. The microparticles may then be dried overnight in a vacuum oven at room temperature to allow any residual heptane to evaporate. The dried particles may be sieved through a 150 m or 250 m screen. The resulting powder may have a final average particle size (D50) of approximately 50 microns and a span of approximately 1.000.

Control Example B1 (Prophetic). Preparation of polydodecaamide (nylon 12, polyamide 12, or PA12) and PA6,6 microparticles by melt emulsification is described. Unfilled PA12 or PA6,6 powder may be prepared from the corresponding pellets by melt extrusion using the same procedure as described in Example B3.

Control Example B2 (Prophetic). Preparation of PA12 melt mixed microparticles and PA6,6 melt mixed microparticles with CNTs (e.g., MWCNTs) by melt emulsification is described. PA12 or PA6,6 may be physically melt mixed with CNTs to produce microparticles by the same melt extrusion process described in Example B3. The CNT may be added after the polyamide resin pellets may be fed into the chamber at a lower speed and sufficiently melted by bringing the temperature close to the melting point of the polymer.

SLS Printing and Mechanical Testing.

Baseline performance of the dried powders may be determined by sintering the material using a SNOWWHITE SLS printer (available from Sharebot). The SNOWWHITE SLS printer is a professional 3D printer that uses a $CO_2$ laser to sinter thermoplastic powders in a layer by layer fashion. The laser selectively fuses the material by scanning cross-sections of the desired object generated using a computer-aided design (CAD) model. After the first layer is scanned, the powder bed is lowered, new powder material is rolled on top and the subsequent layer is scanned until the part is completed. The main advantage of this powder-based system compared with other additive manufacturing techniques is the elimination of printing supports and the ability to reuse materials.

Mechanical properties of Example Bib, Example B2, Comparative Example B1, and Comparative Example B2 may be determined by printing ASTM Tensile D638-14, Type V Dogbone bars on the SNOWWHITE SLS printer.

Example B4. As series of melt emulsification methods described herein were performed using polyamide 12 as the thermoplastic polymer (not grafted to a CNM). The properties of the produced polyamide 12 particles include: $\rho_{aer}$ of about 0.56 g/mL to about 0.59 g/mL, $\rho_{tap}$ of about 0.64 g/mL to about 0.65 g/mL, Hausner ratio of about 1.12 to about 1.15, and an angle of repose of about 30.9° to about 35.3°. By comparison, commercially available polyamide 12 particles produced by precipitation methods have properties measured in-house by the same methods at the foregoing particles that include: $\rho_{aer}$ of about 0.43 g/mL to about 0.50 g/mL, $\rho_{tap}$ of about 0.52 g/mL to about 0.57 g/mL, Hausner ratio of about 1.13 to about 1.21, and an angle of repose of about 30.6° to about 35.5°.

Example C1. General In Situ TPU Polymerization without CNM. A general in situ neat TPU polymerization (no carbon source) is described. A molar ratio of diisocyanate, polyol and chain extender of 1.02:0.5:0.5 (the ratio may be modified to obtain different properties) can be used. Polyetherpolyol and 1,4-butanediol can be dried overnight at 50° C., and 4,4'-methylenebis (phenylisocyanate) (MDI) can be dried at room temperature for 1 h in vacuum oven to remove the traces of moisture. The pre-polymer can be prepared by reacting MDI with polyol for 2 h at 80° C. in dry DMF, with stirring in a three-neck round bottom flask, under nitrogen sweep, with a solids content of 20%. The temperature can be maintained using an oil bath. Conversion of —OH groups can be verified by titration of NCO groups.

Example C2. General In Situ TPU Polymerization with CNM. A molar ratio of diisocyanate, polyol, and chain extender may be 1.02:0.5:0.5 (the ratio may be modified to obtain different properties). Polyetherpolyol and 1,4-butanediol may be dried overnight at 50° C., and 4,4'-methylenebis (phenylisocyanate) (MDI) may be dried at room temperature for 1 h in vacuum oven to remove any traces of moisture. The pre-polymer may be prepared by reacting MDI with polyol for 2 h at 80° C. in dry DMF with stirring in a three-neck round bottom flask under nitrogen sweep, with a solids content of 20%. The temperature may be maintained at 80° C. using an oil bath. Conversion of —OH groups may be verified by titration of NCO groups. The 1,4-butanediol and $2.3 \times 10^{-7}$ mol/cm$^3$ dibutyltinlaurate catalyst may be added to the reaction vessel in dry DMF at 80° C., under continued nitrogen stream. After 6 minutes of chain extension, the calculated amount of modified carbon source may be added to the reaction vessel. The reaction may be stirred for an additional 2 h, and the resulting viscous mixture may be then poured into a mold to evaporate the DMF. Once the DMF is evaporated, the residual solvent may be removed by placing the polymer in a vacuum oven at 50° C. overnight. Notwithstanding, the CNM may be added prior to the addition of the polyol, prior to the addition of the chain extender, or after the completion of the polymerization.

Figure 5:
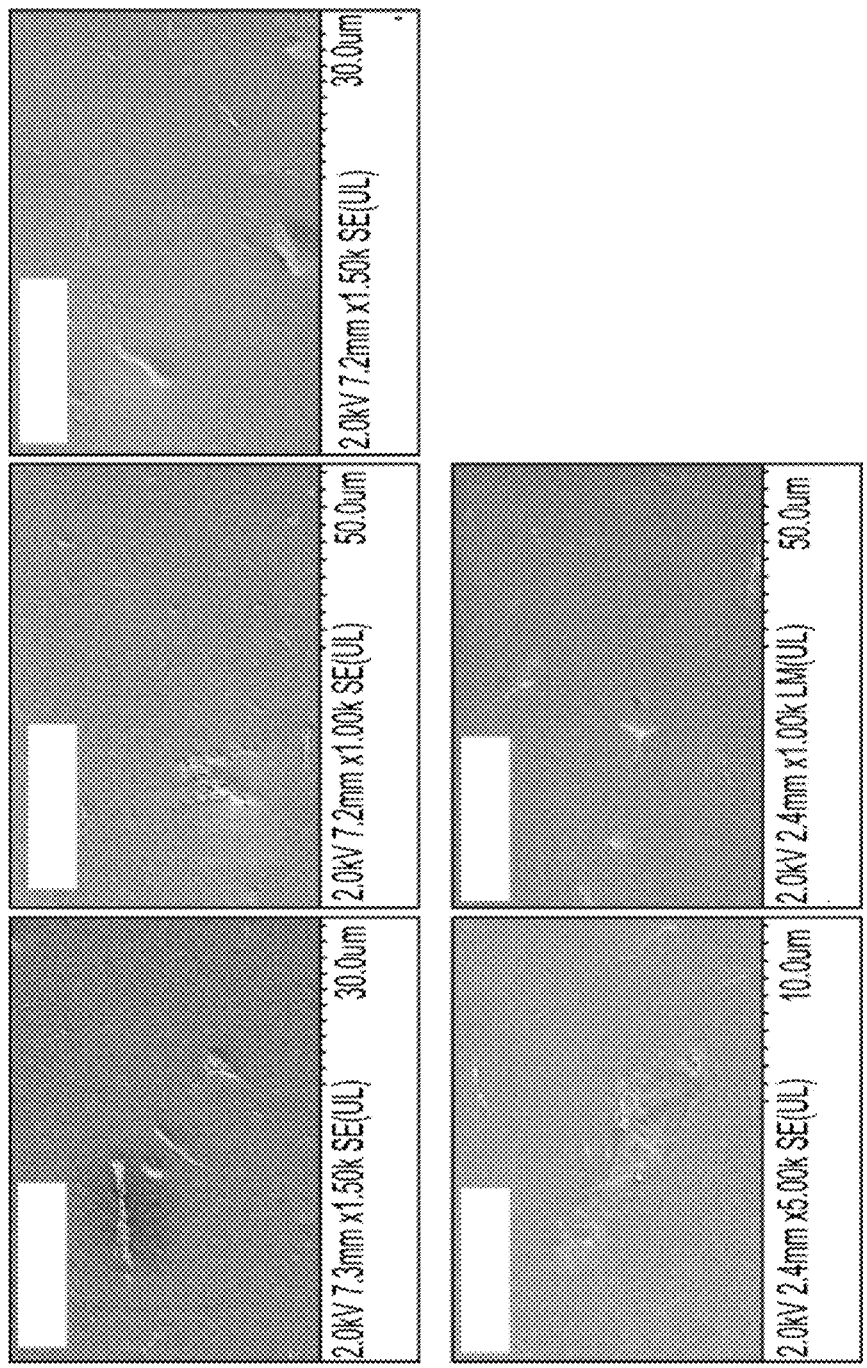
FIG. 5 is scanning electron microscope (SEM) cross sectional images of a carbon nanomaterial-grafted-polyurethane.

Example C3. FIG. 5 is a nonlimiting example of Scanning Electron Microscope (SEM) cross sectional images of a graphene oxide-grafted-polyurethane, synthesized TPU (MDI, p (THF), 1,4-BD) 0.5% graphene oxide, prepared as follow: the molar ratio of diisocyanate, polyol and chain extender was 1.02:0.5:0.5 (the ratio may be modified to obtain different properties). Polyetherpolyol and 1,4-butanediol were dried overnight at 50° C. and MDI was dried at room temperature for 1 h in vacuum oven to remove the traces of moisture. Graphene oxide was dried for 3 hours at 50° C. in vacuum oven. To a three-neck round bottom flask equipped with argon inlet was added poly(tetrahydrofuran) (10 g, 0.01 mol, 1000 kDa), methylene diphenyl diisocyanate (MDI, 5.2 g, 0.0204 mol), and 55 mL of dry DMF. The reaction mixture was heated to 80° C. and then allowed to react under vigorous stirring for 2 hours to obtain the prepolymer. Separately, graphene oxide (0.08 g) was mixed with 10 mL of DMF and sonicated for 1 hour to give a stable dispersion of GO. After 2 hours at 80° C., 1,4-butanediol (0.9 g, 0.01 mol) with 5 mL dry DMF and one drop of dibutyltinlaurate catalyst were added to reaction vessel in dry DMF keeping reaction temperature at 80° C. under continued argon. After 5 minutes of chain extension the GO dispersion was added to the reaction mixture. The reaction was vigorously stirred for an additional 2 hours, and the viscous mixture was then poured into a Teflon lined mold to evaporate the DMF. Once the DMF had been evaporated, the residual solvent was removed by placing the polymer in a vacuum oven at 50° C. overnight. The (SEM) cross sectional images in FIG. 5 show good dispersion throughout TPU matrix.

Example C4. As series of melt emulsification methods described herein were performed using ELASTOLLAN polyurethanes as the thermoplastic polymer (not grafted to a CNM). The properties of the produced polyurethane particles include: $\rho_{aer}$ of about 0.56 g/mL to about 0.62 g/mL, $\rho_{tap}$ of about 0.68 g/mL to about 0.71 g/mL, Hausner ratio of about 1.17 to about 1.21, and an angle of repose of about 31.0° to about 35.1°. By comparison, commercially available polyurethane particles produced by cryomilling methods have properties measured in-house by the same methods at the foregoing particles that include: $\rho_{aer}$ of about 0.51 g/mL to about 0.53 g/mL, $\rho_{tap}$ of about 0.64 g/mL to about 0.68 g/mL, Hausner ratio of about 1.22 to about 1.34, and an angle of repose of about 35.7° to about 36.8°.

Prophetic Example C1. Microwave-Assisted Solid State Grafting

1) Surface modification via microwave radiation is described. Prior to synthesis the polymer composite, the CNTs may be carboxylated, Carboxylation of CNTs may be performed by treating the CNTs in a mixture of concentrated sulfuric acid and nitric acid via microwave radiation, which may be accomplished by combining 1 g of CNTs and 100 mL of a 1:1 concentrated $H_2SO_4$ and concentrated $HNO_3$. The flask may then be subjected to microwave radiation at 140° C. for 10 minutes. After the acid treatment, the CNTs may be transferred into a beaker, followed by the addition of 100 mL deionized (DI) water, and the mixture cooled down to room temperature. The oxidized product may be filtered using a Teflon membrane with a pore size of 0.22 m. The resulting carboxylated CNT products may be washed with DI water until a neutral pH is reached and then dried in a vacuum oven.

2) Grafting of carboxylated CNTs via microwave radiation (5 wt % CNTs) is described. 1 g of carboxylated CNTs may be dispersed in 10 mL of THF via ultrasonication. In a separate container, 20 g of TPU may be dissolved in 100 mL of THF. When the carboxylated CNTs are well dispersed they may be added dropwise to the TPU solution with stirring. Stirring may be continued until a homogenous mixture is obtained. The mixture may then be poured into a mold and the solvent evaporated. The mixture of TPU and carboxylated CNTs mixture can then be treated under microwave radiation for 5 min, with 50% total power output (50% of 800 W).

Prophetic Example C2. Fullerene (Hydroxyl Modified)

1) Surface modification of fullerene is described. Fullerene soot may initially be annealed at 450° C. for 4 h. The pristine fullerene may then undergo oxidation to functionalize the surface of the molecules. Oxidation of fullerenes may be carried out by refluxing with concentrated nitric acid. 1.5 g of pristine fullerene $C_{60}$ may be refluxed at 120° C. with 70 ml concentrated $HNO_3$ solution for 48 h. The mixture may then be diluted with distilled water and filtered using, for example, a Teflon membrane with a pore size of 0.45 m. The oxidized material may then be washed with distilled water until a neutral pH is reached, then dried under vacuum to remove residual water. The dried, hydroxyl functionalized fullerene powder may then be used in polymerization reactions.

2) Grafting hydroxyl functionalized fullerene to TPU via in-situ polymerization is described. Depending on when the functionalized fullerene may be added to the polymerization, the material may be used to graft to the polymer backbone or to endcap the polymer chains (see in-situ polymerization with carbon source above).

Prophetic Example C3. Nanotubes (PCL-CNTs)

1) Oxidation of CNTs is described. The carbon nanotubes (CNTs) may be oxidized before further treatment can occur. This transformation may be achieved by dispersing 1 g of raw CNTs in 100 ml mixture of concentrated sulfuric acid and nitric acid in a ratio of 3:1 using an ultrasonicator. The mixture may then be heated gradually to 90° C. and may be stirred for 30 minutes. After the reaction is completed, the mixture may be diluted with DI water and filter via Teflon membrane. The product may then be washed with DI water until a neutral pH is reached, and then dried in a vacuum oven.

2) Acid chloride functionalization of the CNTs surface is described. Prior to grafting the oxidized CNT to polyurethanes/polyols via excess hydroxyl groups, the oxidized CNT may be further functionalized with thionyl chloride ($SOCl_2$). 1 g of the oxidized CNTs may be dispersed in 10 mL $SOCl_2$ with ultrasonication. The mixture may then be heated slowly to 65° C. and kept under reflux for 1 day with stirring. Then, the mixture may be filtered via a 0.22 m Teflon membrane. Dry acetone may then be used to wash the product to obtain the acid chloride intermediate.

3) Grafting to poly(ε-caprolactone) (PCL)-diol/general polyol. The solid acid chloride functionalized CNT may be immediately transferred into a solution of PCL-diol (average Mn of 530 g/mol to 2,000 g/mol) in dry THF, and stirred at 60° C. for 24 h. The resulting reaction mixture may be filtered, washed and dried to obtain the polyol grafted CNTs. This method may also be used to cap TPUs that contain hydroxyl end groups.

4) Grafting polyol functionalized CNTs to TPU via in-situ polymerization. The polyol functionalized CNTs may then be used in an in-situ TPU polymerization in order to graft the nanotubes onto the polymer chains (see polymerization procedure described above). The material may also be used to endcap the polymer if added after the completion of the polymerization, and if isocyanate groups are present in excess.

Prophetic Example C4. Graphene (Isocyanate Modified)

1) Isocyanate functionalization of graphene oxide (GO) is described. GO may be first dispersed in water via ultrasonication for 1 h, and may be followed by centrifugation for 10 min at 4,000 rpm. The GO suspension may then be subjected to a solvent-exchange process to obtain a dispersion of GO in DMF. The solvent-exchange process may be performed by adding DMF to the aqueous GO, followed by ultrasonication, centrifugation, and then removal of the supernatant liquid. This process should be repeated 3 times. Next, the GO may be reacted with an aliphatic polyisocyanate (PI) (e.g., DESMODUR® N75) to produce the isocyanate-functionalized GO. The GO (1 g) may be added to a 250-mL round-bottom flask equipped with a magnetic stir bar, at a speed of 200 rpm and a flow of nitrogen. 100 mL anhydrous DMF may be added, and the mixture stirred until a homogeneous suspension is formed. Next, 40 mmol of PI may be added to the suspension and the mixture stirred under nitrogen for 72 h at 50° C. Following the reaction, the mixture may then be poured into dichloromethane (DCM) to coagulate the product, i.e., the polyisocyanate-functionalized graphene oxide (PI-GO). The PI-GO product may then filtered and washed with additional DCM.

2) Method for grafting the polyisocyanate-functionalized graphene oxide (PI-GO) to TPU via in-situ polymerization is described. A calculated amount of PI-GO may be dispersed in dry DMF by sonicating for 30 minutes. Upon formation of a homogenous solution, the resulting mixture may be transferred to a 2 liters 3-neck round bottomed flask equipped with a condenser and a nitrogen purge. To the flask, may be added methylene diphenyl diisocyanate and poly(tetrahydrofuran) (Mw of about 1000 g/mol) (at a molar ratio of 1:0.5) and dry DMF (20 wt % solids reaction). The reaction mixture may be heated to 80° C. for 2 h. Next, 1,4-butanediol (0.5 equivalents) and $2.3 \times 10^{-7}$ mol/cm$^3$ dibutyltinlaurate catalyst may be added to the reaction vessel in dry DMF at 80° C. under continued stream of nitrogen. The mixture may be stirred for an additional 2 h, at 80° C. Upon completion, the reaction vessel may be degassed via vacuum until no more bubbles are seen, and the viscous polymer solution may be poured into an aluminum pan to evaporate the solvent.

Prophetic Example C5. Modified CNMs Grafted Polyurethane Via CNM Grafted 4,4'-Methylene bis(phenylisocyanate) (MDI) and Polyurethane Pre-Polymers A GO may be reacted directly with a diisocyanate monomer prior to the polymerization reaction. A 0.033 wt % GO composite may be prepared by dispersing 50 mg of GO in 500 g of dry DMF with ultrasonication at room temperature for 30 min. The homogenous solution may then be added to a 1 liter flask equipped with a condenser and nitrogen purge. Next, 36 g of MDI may be added to the GO dispersion, and may be heated to 80° C. The solution may be stirred for 2 hours in order to attach the GO sheets to the MDI monomer. Then, 64 g of poly(tetrahydrofuran) (1000 Mw) may be added into the flask and the mixture may be stirred at 80° C. for an additional 2 hours to prepare the polyurethane prepolymer with grafted graphene oxide nanosheets. Next, 5.75 g 1,4-butanediol (chain extender) and $2.3 \times 10-7$ mol/cm$^3$ dibutyltinlaurate catalyst may be added to reaction vessel in dry DMF at 80° C. under continued nitrogen. The mixture may be stirred for an additional 2 hours 80° C. Upon completion of the reaction, the reaction vessel may be degassed via vacuum until no more bubbles are seen and then viscous polymer solution may be poured into an aluminum pan to evaporate solvent.

Prophetic Example C6. In-Situ Polymerization with Amine-Modified Carbon Source

1) Preparation of amino-functionalized carbon nanotubes is described. The multiwalled carbon nanotubes (MWCNT) may be first oxidized via a mixture of concentrated sulfuric acid with nitric acid at a volume ratio of 3:1. The acidification may take place with sonication of the MWCNT in the acid solution at 50° C. for 3 hours in an ultrasonic bath. The MWCNT/acid mixture may then be poured into deionized water, filtered, and washed repeatedly until the pH value of the filtration solution may be around 7 (neutral pH). The acidified MWCNT product may then be dried in a vacuum oven at 80° C. for 6 hours. About 1 g of MWCNT-COOH may be dispersed in 2 liters of THF under sonication for at least 1 hour. To this dispersion, while stirring at ambient temperature, may be added 20 g (340 mmol) ethylenediamine (EDA), 1 g (10 mmol) 4-(dimethylamino) pyridine (DMAP), and 10 g (50 mmol) N,N'-dicyclohexylcarbodiimide (DCC). The dispersion/solution may be heated to 60° C. and the temperature may be maintained at 60° C. for 24 hours with stirring. The product may be a black solid that may be collected easily and washed three times with THF (1 liter to 1.5 liters per wash). The product may be dried in a vacuum oven to obtain the functionalized MWCNT.

2) Method for grafting amine functionalized CNTs to TPU via in-situ polymerization is described. 1 g of amine functionalized CNTs may be dispersed in dry DMF (50 mL) via ultrasonication for 30 minutes. Once a homogenous solution is obtained, the solution may be added to a 1 liter 3-necked round bottom flask equipped with a magnetic stirrer, condenser, and a nitrogen purge. Then, 340 mL of dry DMF, MDI (32.5 g, 0.127 mol) and poly(tetrahydrofuran) (1000 Mw, 62.0 g, 0.062 mol) may be added. The reaction may be set to 80° C. for 2 hours. In a separate vessel, 1 g of amine functional nanotubes may be dispersed in dry DMF (50 mL) via ultrasonication. After 2 hours, 1,4-butane diol (5.6 g, 0.062 mol) and $2.3 \times 10^{-7}$ mol/cm$^3$ dibutyltinlaurate catalyst may be added to the 1 liter flask. The reaction may be stirred for an additional 2 hours, and the viscous mixture may then be poured into an aluminum pan to evaporate the DMF. Once the DMF has been evaporated the residual solvent may be removed by placing the polymer in a vacuum oven at 50° C. overnight.

Prophetic Example $C_6$. Preparation of CNM-g-Polyurethane Microparticles (e.g., CNT, GO, Fullerene, etc.) by Melt Emulsification. The CNM-g-polyurethane microparticles may be produced from CNM-g-polyurethane nanocomposites (prepared as described in Examples $C_1$ through $C_6$), by melt extrusion in a HAAKE™ RHEOMIX twin screw extruder with high shear rotors. The extruder may be brought to a temperature around the melting point of the polymer, and the rotors may be started at a slow speed. The TPU-Carbon polymer pellets produced from the CNM-g-polyurethane nanocomposites (prepared as described in Examples $C_1$ through $C_6$) may be added to the heated extruder, followed by the addition of the carrier fluid. The carrier fluid may be PDMS oil with a viscosity of 10,000-60,000 cSt at room temperature. The ratio of PDMS oil to polymer may be 70:30 or 30% polymer solids in 70% oil. An optional dispersing agent or flow aid may be added prior to the carrier fluid to aid with the flow of the dried particles. At 200° C., the extruder may be operated at 200 rpm (maximum speed) for 30 min. The mixture may then be discharged onto a metal tray with dry ice to provide rapid quench cooling. Upon complete sublimation of the dry ice, the oil may be washed away from the microparticles with three heptane washes, and the microparticles may be isolated by vacuum filtration. The microparticles may then be dried overnight in a vacuum oven at room temperature to allow any residual heptane to evaporate. The dried particles may then be sieved through a 150 m or 250 m screen. The resulting powder may have a final average particle size (D50) of approximately 50 microns and a span of approximately 1.000. The span is calculated as the difference between the D90 and the D10 divided by the D50, and is a measure of particle size distribution.

Prophetic Example C7. SLS Printing and Mechanical Testing: The baseline performance of the dried powders may be determined by sintering the material using a SNOW-WHITE SLS printer (available from Sharebot). The laser selectively may fuse the material by scanning cross-sections of the desired object generated using a computer-aided design (CAD) model. After the first layer is scanned, the powder bed may be lowered, new powder material may be rolled on top and the subsequent layer may be scanned until the part is completed. The main advantage of this powder-based system, when compared with other additive manufacturing techniques, is the elimination of printing supports and the ability to reuse materials.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   providing a mixture comprising:
   (a) carbon nanomaterial-graft-polyolefin (CNM-g-polyolefin), wherein the CNM-g-polyolefin comprises a polyolefin grafted to a carbon nanomaterial (CNM) by a direct covalent bond, the CNM-g-polyolefin being produced by in-situ free radical functionalization,
   (b) a carrier fluid that is immiscible with the polyolefin of the CNM-g-polyolefin, optionally (c) a thermoplastic polymer not grafted to a CNM, and optionally (d) an emulsion stabilizer;
   shearing the mixture at a temperature greater than a melting point or softening temperature of the polyolefin and the thermoplastic polymer, when included, and at a shear rate sufficiently high to disperse the CNM-g-polyolefin in the carrier fluid;
   cooling the mixture to below the melting point or softening temperature to form CNM-g-polyolefin particles; and
   separating the CNM-g-polyolefin particles from the carrier fluid;
   wherein the CNM-g-polyolefin particles have a circularity of about 0.90 to about 1.0.

2. The method of claim 1, wherein CNM-g-polyolefin particles have an angle of repose of about 25° to about 45°.

3. The method of claim 1, wherein the CNM-g-polyolefin particles have an aerated density of about 0.55 g/cm$^3$ to about 0.8 g/cm$^3$.

4. The method of claim 1, wherein CNM-g-polyolefin particles have a diameter span of about 0.2 to about 10.

5. The method of claim 1, wherein the CNM-g-polyolefin comprises about 50 wt % to about 99.95 wt % of the polyolefin, and about 0.05 wt % to about 50 wt % of the carbon nanomaterial, based on a total weight of the CNM-g-polyolefin.

6. The method of claim 1, wherein the emulsion stabilizer is present and becomes located upon an outer surface of the CNM-g-polyolefin particles.

7. The method of claim 6, wherein the emulsion stabilizer comprises oxide nanoparticles.

8. The method of claim 7, wherein the emulsion stabilizer is embedded in the outer surface.

9. The method of claim 1, wherein the thermoplastic polymer is present.

10. The method of claim 9, wherein a weight ratio of the CNM-g-polyolefin to the thermoplastic polymer is about 10:90 to about 99:1.

11. The method of claim 1, wherein the CNM-g-polyolefin particles have a D10 of about 0.1 µm to about 125 µm, a D50 of about 0.5 µm to about 200 µm, and a D90 of about 3 µm to about 300 µm, and wherein D10<D50<D90.

12. The method of claim 1, wherein the polyolefin comprises a monomer selected from the group consisting of ethylene, propylene, and any combination thereof.

13. The method of claim 1, wherein the carrier fluid is selected from the group consisting of silicone oil, fluorinated silicone oils, perfluorinated silicone oils, polyethylene glycols, alkyl-terminal polyethylene glycols, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof.

14. The method of claim 1, wherein the carbon nanomaterial is selected from the group consisting of a fullerene, a carbon nanotube, graphite, graphene, and any combination thereof.

* * * * *